(12) United States Patent
Borrell et al.

(10) Patent No.: US 10,370,587 B2
(45) Date of Patent: Aug. 6, 2019

(54) SUSTAINED RELEASE SYSTEM FOR RESERVOIR TREATMENT AND MONITORING

(71) Applicant: JOHNSON MATTHEY PUBLIC LIMITED COMPANY, London (GB)

(72) Inventors: Neil Borrell, Cleveland (GB); Chun-tian Zhao, Cleveland (GB)

(73) Assignee: Johnson Matthey Public Limited Company, London, England (GB)

( * ) Notice: Subject to any disclaimer, the term of this patent is extended or adjusted under 35 U.S.C. 154(b) by 0 days.

(21) Appl. No.: 15/569,428

(22) PCT Filed: Apr. 26, 2016

(86) PCT No.: PCT/GB2016/051172
§ 371 (c)(1),
(2) Date: Oct. 26, 2017

(87) PCT Pub. No.: WO2016/174413
PCT Pub. Date: Nov. 3, 2016

(65) Prior Publication Data
US 2018/0298277 A1 Oct. 18, 2018

(30) Foreign Application Priority Data

Apr. 30, 2015 (GB) .................................. 1507479.2

(51) Int. Cl.
*E21B 47/10* (2012.01)
*C09K 8/92* (2006.01)
*C09K 8/58* (2006.01)
*C09K 8/035* (2006.01)
*C09K 8/52* (2006.01)
(Continued)

(52) U.S. Cl.
CPC .............. *C09K 8/92* (2013.01); *C09K 8/035* (2013.01); *C09K 8/52* (2013.01); *C09K 8/58* (2013.01);
(Continued)

(58) Field of Classification Search
CPC ...... C09K 19/02; C09K 19/06; C09K 19/544; C09K 19/60; C09K 8/035; C09K 8/58;
(Continued)

(56) References Cited

U.S. PATENT DOCUMENTS

| 5,892,147 A | 4/1999 | Garnes et al. |
| 2006/0223713 A1 | 10/2006 | Pakulski et al. |

(Continued)

FOREIGN PATENT DOCUMENTS

| CN | 108102456 A * | 6/2018 |
| WO | WO2012090158 A1 | 7/2012 |

(Continued)

OTHER PUBLICATIONS

PCT/GB2016/051172, International Search Report and Written Opinion dated Aug. 12, 2016.

(Continued)

*Primary Examiner* — Zakiya W Bates
(74) *Attorney, Agent, or Firm* — BakerHostetler

(57) ABSTRACT

Compositions containing a mixture of microcapsules and a bulk polymer, where the microcapsules have an oil field chemical contained within the microcapsules are provided. The microcapsules can be present in a variety of configurations. The microcapsules contain a core or a micro-matrix containing the oil field chemicals. The core or micro-matrix can be surrounded by one or more polymeric shells, where each shell contains at least one polymer that affects the release of the oil field chemical from the composition. The compositions provide for the sustained release of an oil field chemical into fluid in an oil field reservoir over long periods of time. Methods of making the compositions and articles containing the compositions are also provided. Further provided are methods of tracing the movement of fluid in a (Continued)

hydrocarbon reservoir using the compositions, and methods of providing for the sustained release of oil field chemicals.

20 Claims, 10 Drawing Sheets

(51) Int. Cl.
*E21B 43/267* (2006.01)
*E21B 49/08* (2006.01)
*E21B 37/06* (2006.01)
*E21B 41/02* (2006.01)

(52) U.S. Cl.
CPC ........ *E21B 43/267* (2013.01); *E21B 47/1015* (2013.01); *E21B 49/08* (2013.01); *E21B 37/06* (2013.01); *E21B 41/02* (2013.01)

(58) Field of Classification Search
CPC ......... C09K 8/92; C09K 8/72; E21B 47/1015; E21B 43/00; E21B 47/00
See application file for complete search history.

(56) References Cited

U.S. PATENT DOCUMENTS

| | | |
|---|---|---|
| 2009/0325823 A1 | 12/2009 | Pakulski et al. |
| 2013/0068469 A1 | 3/2013 | Lin et al. |
| 2013/0302392 A1* | 11/2013 | Mistry .................... A61K 8/11 424/401 |
| 2013/0327524 A1 | 12/2013 | Sangermano et al. |

FOREIGN PATENT DOCUMENTS

| | | |
|---|---|---|
| WO | WO2015023648 A1 | 2/2015 |
| WO | WO2015039032 A1 | 3/2015 |

OTHER PUBLICATIONS

GB1607257.1, Combined Search and Examination Report under Sectoins 17 and 18(3) dated Nov. 25, 2016.

* cited by examiner

Figure 1. Representations of Particle Structures
Figure 1A. Core-Shell
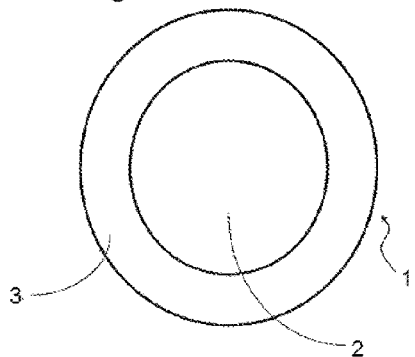
Figure 1B. Core Multi-Shell
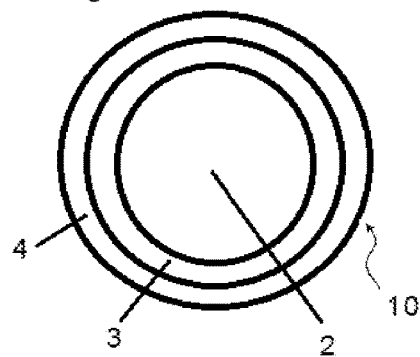
Figure 1C. Multi-Core-Shell
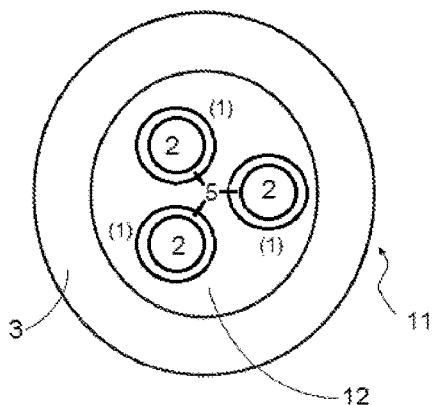
Figure 1D. Micro-Matrix
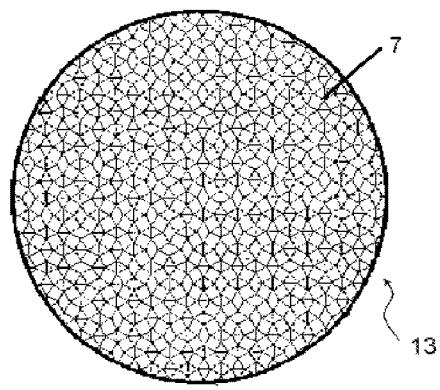
Figure 1E. Micro-Matrix with Shell
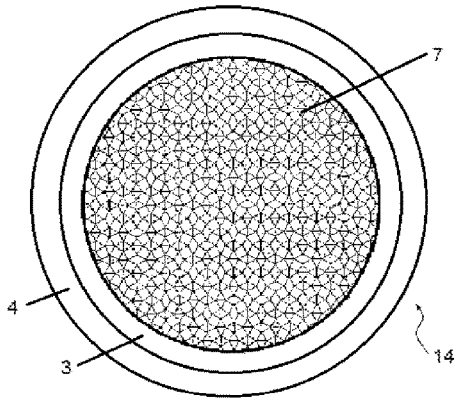
Figure 1F. Multicore-micro-matrix-shell
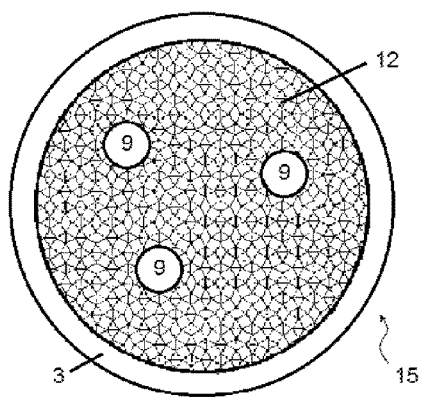

SUSTAINED RELEASE SYSTEM FOR RESERVOIR TREATMENT AND MONITORING

CROSS-REFERENCE TO RELATED APPLICATIONS

This application is the National Stage of International Patent Application No. PCT/GB2016/051172 filed Apr. 26, 2016, which claims priority from Great Britain Patent Application No. 1507479.2 filed Apr. 30, 2015, the disclosures of each of which are incorporated herein by reference in their entireties for any and all purposes.

FIELD OF THE INVENTION

The present invention is directed towards compositions comprising a mixture of a bulk polymer with microcapsules containing one or more oil field chemicals within the microcapsules. Articles comprising microcapsules incorporated into a continuous bulk polymer matrix can provide for the sustained release of the oil field chemical into oil field fluids over periods of time from weeks to years.

BACKGROUND OF THE INVENTION

It is common practice to deliver oilfield chemicals to a subterranean hydrocarbon reservoir to bring about a variety of functions at various stages of hydrocarbon production. Examples of oil field chemicals are scale inhibitors, hydrate inhibitors, corrosion inhibitors, biocides, and wax and asphaltene control substances.

Oilfield fluids are complex mixtures of aliphatic hydrocarbons, aromatics, hetero-atomic molecules, anionic and cationic salts, acids, sands, silts, clays and a vast array of other components. The nature of these fluids, combined with the severe conditions of heat, pressure, and turbulence to which they are often subjected during retrieval, are contributory factors to paraffin deposition (including the precipitation of wax crystals), emulsification (both water-in-oil and oil-in-water), gas hydrate formation, corrosion and asphaltene precipitation in oil and/or gas production wells and surface equipment. This, in turn, decreases permeability of the subterranean formation, reduces well productivity and shortens the lifetime of production equipment. In order to remove such unwanted deposits and precipitates from wells and equipment, it is necessary to stop the production which is both time-consuming and costly.

Further examples of oil field chemicals are thickeners and gel breakers used in hydraulic fracturing. Hydraulic fracturing is a well-established technique for stimulating production from a hydrocarbon reservoir. In a conventional fracturing procedure, a thickened aqueous fracturing fluid is pumped into the reservoir formation through a wellbore and opens a fracture in the formation. Thickened fluid is then also used to carry a particulate proppant into the fracture. Once the fracture has been made and packed with proppant, pumping is stopped. The formation closes onto the proppant pack and oil or gas can flow through the proppant pack to the wellbore. At least some of the aqueous fracturing fluid in the wellbore will be driven back to the surface by fluid produced from the reservoir. The fracturing fluid is subsequently pumped out and hydrocarbon production is resumed. As the fracturing fluid encounters the porous reservoir formation, a filter cake of solids from the fracturing fluid builds up on the surface of the rock constituting the formation. A thickener, which increases the viscosity of the fracturing fluid, can be a polysaccharide. Guar gum, often cross-linked with borate or a zirconium compound, is frequently used. Another category of thickeners which are used are viscoelastic surfactants. An oilfield chemical can be delivered to a reservoir during fracturing. If the fracturing fluid contains a viscosifying thickener, it is normal to supply a so-called breaker (which is usually an oxidizing agent, an acid or an enzyme) into the fracture to degrade the thickener and so reduce the viscosity of the fluid in the fracture after it has served its purpose. This facilitates the flow back to the surface and the flow of produced fluid through the proppant pack towards the wellbore.

A further example of an oil field chemical is chemical tracers used for monitoring of hydrocarbon reservoirs.

Optimal oil production from the reservoir depends upon reliable knowledge of the reservoir characteristics. Traditional methods for reservoir monitoring include seismic log interpretation, well pressure testing, production fluid analysis, production history matching and interwell tracer techniques. Due to the complexity of the reservoir, all information available is valuable in order to give the operator the best possible knowledge about the dynamics in the reservoir. One common secondary oil recovery process is water injection in dedicated injection wells. The water may travel in different layers and sweep (flow across) different areas in the reservoir. Monitoring of the production of this water in different zones in the well is important to design a production program that improves the sweep efficiency and thereby increase oil recovery. Mixing of injection water and formation water originally present in the reservoir may cause supersaturated solutions leading to precipitation of particles (scale) in either the reservoir near-well zone or in the production tubing. By knowing which zone or zones contribute to water production, action can be taken to reduce the effect of scaling and thereby maintain productivity.

The use of tracers to obtain information about a hydrocarbon reservoir and/or about what is taking place therein has been practiced for several decades and has been described in numerous documents. Tracers have primarily been used to monitor fluid paths and velocities. More than one tracer substance can be used concurrently. For instance, U.S. Pat. No. 5,892,147 discloses a procedure in which different tracers are placed at respective locations along the length of a well penetrating a reservoir. The tracers are placed at these locations during completion of the well before production begins. The tracer at each location is either attached to a section of pipe before it is placed at that location or is delivered into the location while perforating casing at that location. When production begins, monitoring the proportions of the individual tracers in the oil or gas produced by the well permits calculation of the proportions of oil or gas being produced from different zones of the reservoir.

Tracers have been used in connection with hydraulic fracturing, mainly to provide information on the location and orientation of the fracture. Tracers can also be used for estimating residual oil saturation. Tracers have been used in single well tests and in interwell tests. In single well tests, a tracer is injected into the formation from a well and then produced out of the same well mixed with fluids from the well. The delay in time needed to return to the ground between a tracer that does not react with the formation (a conservative tracer) and one that does (a partitioning tracer) will give an indication of residual oil saturation, a piece of information that is difficult to acquire by other means. In interwell tests, the tracer is injected at one well along with a carrier fluid, such as water in a waterflood, and detected at a producing well after some period of time, which can range from days to years.

Radioactive and chemical tracers have been used extensively in the oil industry and hydrology testing for decades. Non-radioactive chemical tracers offer distinct advantages over the use of radioactive tracers. For example, there are more unique chemical tracers than radioactive tracers and no downhole logging tools are required.

Oilfield chemicals are normally formulated with adjuvant or carrier chemicals before being introduced into a reservoir. When the formulated material is a liquid, the liquid can be pumped down a wellbore to the reservoir. When the formulated material is a solid, it can be pre-placed onto equipment, such as the well bore, before the equipment is placed in the well. Particles of the oil field chemicals may be absorbed into the pores of porous carrier particles or encapsulated in a structure in which the oilfield chemical is enclosed within a shell of carrier material around the oil field chemical, and the particles are suspended in a fluid and pumped downhole into the reservoir.

Despite the very wide usage of oil field chemicals, many of the current methods of introducing and using these chemicals have disadvantages.

One issue is the difficulty in handling oilfield chemicals that are in different physical states. For example, when different tracers are placed at their respective locations along the length of a well penetrating a reservoir, a stable solid form of a tracer formulation is normally used. Compared to solid tracers, tracers in liquid and gas form are often difficult to formulate and shape into stable solid objects. This can limit the types of tracers that can be used.

Another issue is that some oil field chemicals are reactive, making them difficult to formulate and deliver into the reservoir.

A further issue is that unwanted inhomogeneous compositions can result from formulating some oil field chemicals. This is found when attempting to formulate different tracers with polymers to form objects for application to hydrocarbon reservoirs. Tracers can differ from each other with respect to a variety of properties, such as density, particle size, and in various surface related properties. These differences can be very significant. For example, it is known that the density of oil tracers can vary from 1 to 3 $g/cm^3$ and these differences can result in various problems. The differences between the densities of the tracers can result in compositions comprising a tracer and polymer having significant non-homogeneous structure and morphology. High density tracers tend to settle during the formulation process used to form the tracers into objects. Such non-homogeneous objects tend to show undesired release behavior in a subterranean reservoir environment. Although the use of an extra dispersing/stabilizing additive in the formulation of the objects can partially alleviate this problem, other associated problems, such as poor mechanical strength in a reservoir environment, remain. As a result, sometimes even apparently similar tracers in one family cannot be formulated in the same way.

One of the most important issues is the release of oil field chemicals from formulated articles to the targeted fluid or reservoir areas. While it is often a requirement for oil field chemicals to be released in a sustained manner, e.g. slowly so that treatment can be effective over long periods of time (e.g., years), the release of the chemicals in current commercial practice is often too fast (less than 6 months) and not up to the needs of the industry. As a result, some oil field chemicals have to be repeatedly introduced into wells to ensure that the requisite level of the well treatment agent is continuously present in the well. The release of oil field chemicals, such as tracers, is often not controlled in current practice, causing significant variations over time for both a single tracer and as well as between different tracers. Such issues often result in ineffective treatments or loss of monitoring of the reservoir, and result in lost production revenue due to down time and the costs of the additional materials that are used retreat the wells.

SUMMARY OF THE INVENTION

The present invention has been made in view of the above mentioned issues related to the delivery and release of oil field chemicals. One advantage of this invention is that it provides a means to process, deliver and release oil field chemicals, such as tracers, that can be in solid, liquid or gaseous form. Another advantage of this invention is that it provides a means to overcome problems associated with the use of more than one oil field chemical (e.g. tracers, biocides) in a composition and provides compositions having more uniform macro dimensions. The compositions described herein allow liquid, solid and even gaseous oil field chemicals to be used and also minimize the effects of using oil fields chemicals having different properties (e.g. densities). It is most advantageous that the present invention provides compositions and articles that allow oil field chemicals to be released in a sustained way over a long period of time that is closer to the life of an oil well than what is found in currently used compositions. It is a further advantage of the present invention that the release rate of oil field chemicals is controllable and in some aspects of the present invention, the release rate of oil field chemicals, such as tracers, can be relatively constant over a long period of time. As a result, the present invention provides ways to easily formulate and deliver oil field chemicals, such as tracers, biocides, scale inhibitors, etc., to a hydrocarbon reservoir, as well as methods to monitor and trace the flow of fluids in a hydrocarbon reservoir.

In the first aspect of the invention, a composition comprises (a) microcapsules comprising an oil field chemical and a microencapsulant, where the microcapsules have an outer surface, and the oil field compound is contained within the microcapsules and (b) a bulk polymer, where the microcapsules are embedded within the bulk polymer. The microcapsules can have a variety of structures, as described herein. The composition can be in the form of an article configured for placement in a hydrocarbon reservoir. The composition can provide for the release of an oil field chemical such that various amounts of the oil field chemical can be released over various lengths of time.

In another aspect of the invention, a hydrocarbon reservoir monitoring system comprises a composition of the first aspect of the invention.

In still another aspect of the invention, methods of making the compositions and articles described herein comprise: (a) providing a plurality of microcapsules, each microcapsule comprising an oil field compound and a polymeric microencapsulant, where the microcapsule comprises a core shell structure, a core multishell structure, a multi-core shell structure, a micro-matrix structure, a micro-matrix with shell structure or a multi-core-micro-matrix with shell structure, and (b) embedding the microcapsule particles with a bulk polymer In yet another aspect of the invention, methods for providing for the slow release of an oil field chemical into a well or hydrocarbon reservoir comprises placing within a well or reservoir a composition of the first aspect of the invention where the oil field chemical is a well treatment agent.

In yet another aspect of the invention, methods for tracing fluid flow from a hydrocarbon reservoir comprises the steps of placing within a well penetrating said reservoir a composition of the first aspect of the invention, where the oil field chemical is a tracer, collecting one or more samples of fluids flowing from the well and analysing said sample to determine: (a) the presence or absence of the tracer or (b) the concentration of one or more tracers in fluids flowing from the well.

BRIEF DESCRIPTION OF THE DRAWINGS

The invention may be understood from the following detailed description when read in connection with the accompanying drawings.

FIGS. 1A-1F are representations of the structures of different configurations of microcapsules.

DETAILED DESCRIPTION OF THE INVENTION

Figure 2:
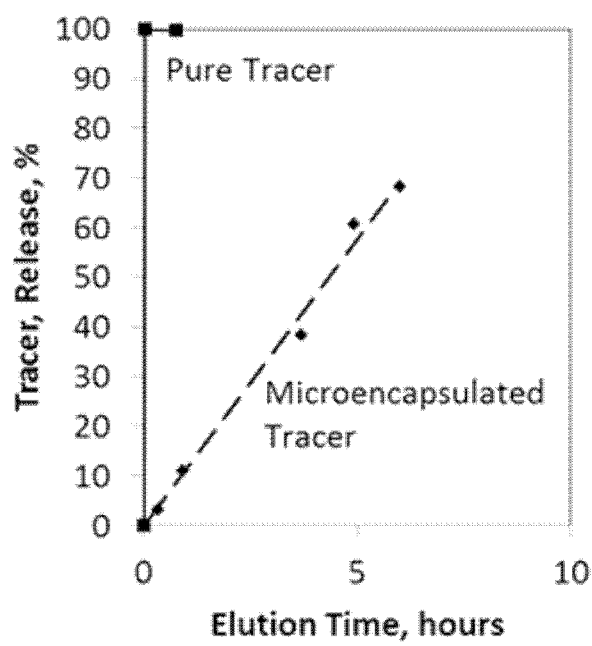
FIG. 2 is a graphical representation of the dissolution rate of a tracer into an eluent and the release rate of a tracer from microcapsules into an eluent.

The inventors have surprisingly discovered that compositions and articles having the structures described herein provide a means for the sustained release of compounds under conditions simulating those found in hydrocarbon reservoirs. By microencapsulating an oil field chemical into a microcapsule, incorporating the microcapsule into a bulk polymer to form a mixture and then forming an article from the mixture, the article provides for a much slower release than is observed from either simply incorporating an oil field chemical into a liquid or a bulk polymer, or just incorporating an oil field chemical into a microcapsule. The microcapsule and the bulk polymer in the composition appear to work synergistically so that the reduction of the release rate of the oil field chemicals from the composition is much greater than expected from simple combination of the two components as barriers. The methods and processes described herein can overcome difficulties in making compositions comprising oil field chemicals (e.g. tracers, biocides, scale inhibitors) having different properties. The compositions can be macroscopically uniform throughout, independent of the oil field chemical selected. Liquid, solid and even gas oil field chemicals can be processed by the methods described herein to form the same types of controlled release compositions. Applications of the compositions and articles to hydrocarbons reservoirs or wells provide ways to treat hydrocarbon reservoirs and ways to monitor and trace the flow of fluids in the hydrocarbon reservoirs.

The following definitions are provided in order to aid those skilled in the art in understanding the detailed description of the present invention.

As used in this specification and the appended claims, the singular forms "a", "an" and "the" include plural referents unless the context clearly indicates otherwise. Thus, for example, reference to "a microcapsule" includes a mixture of two or more microcapsules, unless specifically stated otherwise.

As used herein, the term "about" means approximately and refers to a range that is ±25%, preferably ±10%, more preferably, ±5%, or most preferably ±1% of the value with which the term is associated.

When a range, or ranges, for various numerical elements are provided, the range, or ranges, includes the end values, unless otherwise specified.

The term "release" means a process where one or more compounds introduced to a subterranean hydrocarbon (oil or gas) reservoir or well in the form of a composition or an article move from the composition or article into one or more fluids in the reservoir. The term "release", when used in the context of laboratory testing, refers to the movement of one or more compounds from a composition or article into an eluent that is representative of a fluid in the reservoir.

The term "sustained release" means a process whereby one or more compounds are released from a composition or an article and move from the composition or article into one or more fluids in a subterranean hydrocarbon (oil or gas) reservoir or well over a period of time from more than 24 hours, preferably more than 6 months, more preferably more than 1 year, even more preferably more than 5 years, to more than 20 years.

The term "oil field chemical" means one or more chemical compounds or mixtures that can be released into a subterranean hydrocarbon (oil or gas) reservoir or well. The term "oil field chemical" includes tracers and well treatment agents.

The term "tracer" means one or more compounds that can be used to trace the movement of a material in a hydrocarbon reservoir, or to detect the composition or to measure the properties of specified areas of a hydrocarbon reservoir. The term "radioactive tracer" means a tracer which is radioactive. The term "chemical tracer" means a non-radioactive chemical compound that is used as a tracer.

The term "well treatment agent" refers to any of the various compounds or mixtures placed within a well or hydrocarbon reservoir to address or prevent various undesired effects caused by a variety of conditions including, but not limited to scale formation, salt formation, paraffin deposition, emulsification (both water-in-oil and oil-in-water), gas hydrate formation, corrosion, asphaltene precipitation, and paraffin formation. Well treatment agents include, but are not limited to, scale inhibitors, hydrate and halite inhibitors, corrosion inhibitors, biocides, wax and asphaltene control substances, demulsifiers, gel breakers, drag reducers, salt inhibitors, gas hydrate inhibitors, oxygen scavengers, foaming agents, surfactants and well clean up substances (such as enzymes; organic molecules, acids, esters, and aliphatic compounds).

The term "microcapsule" refers to a structure having an oil field chemical contained within the microcapsule by a microencapsulant. A microcapsule has either (a) a core comprising an oil field chemical with a shell around the core or (b) a micro-matrix comprising an oil field chemical with or without a shell.

The term "core" refers to the central inner portion of a composition. The core can be a simple phase of oil field chemicals, or a mixture comprising one or more oil field chemicals and non-polymeric materials. The core can contain a mixture of a plurality of sub-cores and non-polymeric materials. This configuration of a plurality of sub-cores is referred to as a "multicore." Each of the sub-cores comprise one or more oil field chemicals. Each of the sub-cores can be surrounded by a polymeric shell.

The term "matrix" refers to a three dimensional structure made of polymers.

The term "micro-matrix" refers to a three dimensional structure on micro-scale, i.e., with a size from nanometer to sub-millimeter. The three dimensional structure is made of polymers and contains one or more oil field chemicals distributed within the structure. A micro-matrix can be regarded as a special type of core. It differs from normal cores in that it has a 3-dimensional polymeric structure. The polymers can be pre-formed or formed in-situ by polymerization of monomers. The micro-matrix can have oil field chemicals molecularly distributed in the entire micro-matrix structure or comprise a plurality of sub-cores, each containing an oil field chemical.

"Microencapsulant" refers to all materials, either polymeric or non-polymeric, within a microcapsule excluding oil field chemicals within the microcapsule and excluding non-polymeric materials within cores or multi-cores. Microencapsulants form a three-dimensional structure in the form of shells or micro-matrixes that contain the cores, sub-cores, multi-cores or oil field chemicals that are molecularly dispersed in the microencapsulant.

The term "shell" refers to a polymeric coating that at least partially surrounds a core, a micro-matrix or an adjacent shell between the shell and a core or micro-matrix.

The term "bulk polymer" refers to one or more polymers that can be combined with a plurality of microcapsules, where each of the microcapsules contains one or more oil field chemicals. Bulk polymers can be combined with compositions containing microcapsules and having various configurations described herein to obtain an article in the form of a final product, such as in the form of a film, strip, bead, two-part resin system, etc.

The term "embedding prepolymers and/or monomers" refers to prepolymers and/or monomers that are mixed with microcapsules and then reacted to form a bulk polymer in which microcapsules become mixed with, or embedded in the bulk polymer.

The term "derivative of" a compound, such as cellulose or starch, means one or more compounds having the basic backbone of the compound, where one of more groups in the compound has been reacted with one or more reactants and the basic structure remains. A derivative of a cellulose would be a polysaccharide consisting of linear chains of large numbers of β-linked D-glucose units, where one or more of the hydroxyl groups is reacted with one or more compounds and the basic cellulose structure remains. A derivative of a starch would have a large number of glucose units joined by glycosidic bonds, where one or more of the groups within the starch have been chemically reacted with one or more reactants and the basic starch structure remains.

The term "additive" refers to any compound or mixture that is introduced into a bulk polymer to help incorporate the microcapsules and help form compositions and articles.

The term "initiator" refers to one or more compounds that react with a monomer to form an intermediate compound capable of linking successively with a large number of other monomers into a polymeric compound.

The term "catalyst" refers to one or more compounds that catalyse the reaction of monomers and/or an intermediate compound to form a polymer.

The term "nanoparticle" refers to particles having at least one dimension (d) of ≤500 nm.

"Wt %" refers to the weight of a component or ingredient relative to the total dry weight of a composition, i.e., weight percent. For example, a dosage form comprising 40 wt % of compound (1) that weighs 1000 mg contains 400 mg of compound (1).

The term "cumulative % of the applied tracer (or oil field chemical) released" refers to the total percentage of the initial amount of a tracer (or oil field chemical) that was released from a composition over a specific period of time under specific test conditions.

Oil Field Chemicals

In each of the compositions described herein, at least one oil field chemical is present within the core or micromatrix of the microcapsules. The oil field chemical is a tracer or well treatment agent. Preferably, the oil field chemical is a tracer, a corrosion inhibitor or a biocide. More than one oil field chemical can be incorporated into the core or micro-matrix of the composition. When one or more oil field chemicals are incorporated into the core or micro-matrix of the composition, the one or more oil field chemicals can be mixed together or can be present in the core or micro-matrix in discrete structures, such as in a multi-core structure. When the core or micro-matrix contains two or more oil field chemicals, all of the oil field chemicals can be oil soluble or water soluble, or the compounds can be a mixture of water soluble and oil soluble compounds. When the core or micro-matrix contains two or more oil field chemicals, one or more of the compounds can partition between oil and water, or can partition between a fluid and gas in the reservoir. One or more oil field chemicals can also be present in one or more shells surrounding the core. When two or more oil field chemicals are present in the composition, all of the oil field chemicals can be oil soluble oil field chemicals, all of the oil field chemicals can be water soluble oil field chemicals, or the oil field chemicals can be a mixture of oil soluble oil field chemicals and water soluble oil field chemicals. When two or more oil field chemicals are present in the composition, at least one of the oil field chemicals is located within a core or micro-matrix.

The oil field chemicals are not chemically linked or bound to, and do not react with, any other components of the composition.

The oil field chemicals can be solids, liquids or gases at the temperature at which the chemicals are to be released. One of the advantages of the use of the compositions and articles described herein, is that gaseous, liquid and/or solid oil field chemicals can be incorporated into the compositions or articles described herein, and then delivered to the targeted hydrocarbon reservoir or well, where they are slowly released into fluids (liquid or gas) in the reservoir or well.

Solid oil field chemicals can be pre-treated to have a desired range or distribution of particle sizes by milling or grinding. Oil field chemicals can be used alone or mixed with non-polymeric compounds. The oil field chemicals, either alone or as mixtures, can form cores, sub-cores or multicores in a microcapsule. Oil field chemicals can also exist in the form of molecules individually distributed in a micro-matrix or shell in a microcapsule. Non-polymeric compounds that can be mixed with oil field chemicals include, but are not limited to, solvents or waxes. Examples of solvents are toluene, xylene, cyclohexane, castor oil, etc. Examples of waxes are cetyl palmitate and caster wax.

Tracers

Any chemical compound can be used as a tracer within the present invention if it can be detected within one or more fluids within a reservoir and does not interfere or interact undesirably with other materials present in the oil well at the levels used. Preferably, before the tracer is added to the well, the tracer is not present at a measurable level in reservoir fluids from the well to be tested. This means that background levels of the tracer should be less than the limit of detection. It is also preferred that the tracer can be measured at levels sufficiently low to allow its use to be economical. While upper limits for the concentration of the tracer in reservoir fluid can be as high as about 10,000 parts per million, for a variety of reasons, such as economical, toxicological, causing unacceptable interactions with other materials present in an oil well, etc. the tracers can be detectable at a range of from about 1 part per quadrillion to about 500 parts per million in the fluid being analyzed. Preferably the tracers are detectable at a range of from 1 part per trillion to about 50 parts per million. More preferably the tracers are detectable at a range of from 5 parts per trillion to about 10 parts per million. Preferably the tracer is not a radioactive tracer.

Tracers can be solids, liquids or gases at room temperature and can be released to either a liquid or a gas inside a hydrocarbon reservoir.

The tracers can be present in the compositions in an amount from about 0.5% to about 80% by weight of the total composition, preferably from about 2% to about 65% by weight of the total composition, more preferably from about 5% to about 50% by weight of the total composition. The amount of tracer present in the compositions can be based upon the elution profile and the expected concentration in the reservoir fluid into which the tracer will move when eluted from the compositions. Concentrations of the tracer in the eluent can be at least about 1 part per quadrillion and preferably at a concentration of less than or equal to 10,000 parts per million. Preferably the concentration of the tracer in the eluent is from about 100 parts per trillion to about 100 parts per million.

Oil Soluble Tracers

Tracers used to track the movement of oil soluble materials generally have low water solubility and high (>1000) organic/water partition coefficients. Several families of such compounds have been used. Illustrative examples of suitable tracer compounds of the present invention are organic compounds selected from the hydrocarbons and halogenated hydrocarbons. Mixtures of these compounds can also be used although single compounds are preferred. The tracer compound can preferably be a halogenated aromatic, polycyclic aromatic, heterocyclic aromatic, aromatic ketone, cycloalkane, or aliphatic compound, where the compound including at least one halogen selected from the group consisting of Br, Cl, F and I. Suitable tracers include, but are not limited to 4-iodotoluene, 1,4-dibromobenzene, 1-chloro-4-iodobenzene, 5-iodo-m-xylene, 4-iodo-o-xylene, 3,5-dibromotoluene, 1,4-diiodobenzene, 1,2-diiodobenzene, 2,4-dibromomesitylene, 2,4,6-tribromotoluene, 1-iodonaphthalene, 2-iodobiphenyl, 9-bromophenanthrene, 2-bromonaphthalene, bromocyclohexane, 1,2-dichlorobenzene, 1,3-dichlorobenzene, 1,4-dichlorobenzene, 1-bromododecane, bromooctane, 1-bromo-4-chlorobenzene, bromobenzene, 1,2,3-trichlorobenzene, 4-chlorobenzylchloride, 1-bromo-4-fluorobenzene, perfluoromethylcyclopentane (PMCP), perfluoromethylcyclohexane (PMCH), perfluorodimethylcyclobutane (PDMCB), m-perfluorodimethylcyclohexane (m-PDMCH), o-perfluorodimethylcyclohexane (o-PDMCH), p-Perfluorodimethylcyclohexane (p-PDMCH), perfluorotrimethylcyclohexane (PTMCH), perfluoroethylcyclohexane (PECH), and perfluoroisopropylcyclohexane (IPPCH).

Oil soluble tracers can also be oil dispersible nanoparticles which may be detected by analytical techniques such as light absorption and emission (e.g., Raman, UV, IR and fluorescence) or electrochemical methods.

Water Soluble Tracers

Water soluble tracers can be used to trace the movement of production fluids containing water. Groups of compounds that are commonly described in the art as dyes, pigments, and colorants can be used. These compounds are often visible to the eye in either ambient or ultraviolet light. Suitable tracers useful with the present invention include but are not limited to those selected from the group consisting of: Acridine Orange; 2-anthracenesulfonic acid, sodium salt; Anthrasol Green IBA (Solubilized Vat Dye); bathophenanthrolinedisulfonic acid disodium salt; amino 2,5-benzene disulfonic acid; 2-(4-aminophenyl)-6-methylbenzothiazole; Brilliant Acid Yellow 8G (Lissamine Yellow FF, Acid Yellow 7); Celestine Blue; cresyl violet acetate; dibenzofuransulfonic acid, 1-isomer; dibenzofuransulfonic acid, 2-isomer; 1-ethylquinaldinium iodide; fluorescein; fluorescein, sodium salt (Acid Yellow 73, Uranine); Keyfluor White ST (Flu. Bright. 28); Keyfluor White CN; Leucophor BSB (Leucophor AP, Flu. Bright. 230); Leucophor BMB (Leucophor U, Flu. Bright. 290); Lucigenin (bis-N-methylacridinium nitrate); mono-, di-, or tri-sulfonated naphthalenes, including but not limited to—1,5-naphthalenedisulfonic acid, disodium salt (hydrate) (1,5-NDSA hydrate); 2-amino-1-naphthalenesulfonic acid; 5-amino-2-naphthalenesulfonic acid; 4-amino-3-hydroxy-1-naphthalenesulfonic acid; 6-amino-4-hydroxy-2-naphthalenesulfonic acid; 7-amino-1,3-naphthalenedisulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10-perylenetetracarboxylic acid; Phorwite CL (Flu. Bright. 191); Phorwite BKL (Flu. Bright. 200); Phorwite BHC 766; Pylaklor White S-15A; 1,3,6,8-pyrenetetrasulfonic acid, tetrasodium salt; pyranine, (8-hydroxy-1,3,6-pyrenetrisulfonic acid, trisodium salt); quinoline; Rhodalux; Rhodamine WT; Safranine O; Sandoz CW (Flu. Bright. 235); Sandoz CD (Flu. Bright. 220); Sandoz TH-40; Sulforhodamine B (Acid Red 52); Tinopal 5BM-GX; Tinopol DCS; Tinopal CBS-X; Tinopal RBS 200; Titan Yellow (Thiazole Yellow G), and any existing ammonium, potassium and sodium salts thereof. Preferred fluorescent tracers are 1,3,6,8-pyrenetetrasulfonic acid, tetrasodium salt and 1,5-naphthalenedisulfonic acid, disodium salt (hydrate).

Water soluble tracers can also be water dispersible nanoparticles, which may be detected by analytical techniques such as light absorption and emission (e.g., Raman, UV, IR and fluorescence) and electrochemical methods.

Preferably the chemical tracers useful with the present invention include, but are not limited to: halogenated benzoic acids, salts and compounds derived from the acid such that they hydrolyze to form the acids, or salts thereof, in the reservoir, including 2-fluorobenzoic acid; 3-fluorobenzoic acid; 4-fluorobenzoic acid; 3,5-difluorobenzoic acid; 3,4-difluorobenzoic acid; 2,6-difluorobenzoic acid; 2,5-difluorobenzoic acid; 2,3-difluorobenzoic acid; 2,4-difluorobenzoic acid; pentafluorobenzoic acid; 2,3,4,5-tetrafluorobenzoic acid; 4-(trifluoro-methyl)benzoic acid; 2-(trifluoromethyl)benzoic acid; 3-(trifluoro-methyl)benzoic acid; 3,4,5-trifluorobenzoic acid; 2,4,5-trifluorobenzoic acid; 2,3,4-trifluorobenzoic acid; 2,3,5-trifluorobenzoic acid; 2,3,6-trifluorobenzoic acid; 2,4,6-trifluorobenzoic acid and the brominated, chlorinated and iodinated analogs thereof. When more than one halogen atom is present on the benzoic acid, the halogens can be the same or different. Preferably, the salts of the halogenated benzoic acids are sodium salts or potassium salts.

Well Treating Agents

Numerous types of well treating agents are known in the art. Well treating agents are used to inhibit, control, prevent or treat various conditions that can affect the reservoir and the production of oil and/or gas from the reservoir. Well treating agents are generally described in families based on the function they perform, such as scale inhibitors, asphaltene dispersants and inhibitors, acid stimulation chemicals, sand control agents, napthenate and other carboxylate anti-fouling agents, corrosion control agents, gas hydrate control agents, wax (paraffin wax) control agents, demulsifiers, foam control agents, flocculants, biocides, hydrogen sulfide scavengers, oxygen scavengers, drag-reducing agents (DRA's), hydrotesting chemicals and foamers for gas well deliquification. In many cases, it would be helpful if well treating agents were able to be slowly released over time to help maintain the well treating agent at an effective concentration in the well or reservoir. Various types of well treating agents are described by Malcolm A. Kelland in Production Chemicals for the Oil and Gas Industry, Second Edition Hardcover, 16 Apr. 2014.

Biocides include oxidising biocides; nonoxidizing organic biocides, such as aldehydes, quaternary phosphonium compounds, quaternary ammonium compounds, cationic polymers, organic bromides, metronidazole, isothiazolones (or isothiazolinones) and thiones, organic thiocyanates, phenolics, alkylamines, diamines and triamines, dithiocarbamates, 2-decylthioletanamine and hydrochloride salts, triazine derivatives, and oxazolidines; and biostats (control "biocides" or metabolic inhibitors), such as anthraquinone, nitrates and nitrites. Specific examples of biocides include acrolein, bronopol, 2,2-dibromo-3-nitrilopropionamide, formaldehyde, glutaraldehyde, tetrakishydroxymethyl phosphonium sulfate (THPS), $[NR_1R_2R_3R_4]^+Cl^-$ (where $R_1$=alkyl($C_{14}$-$C_{18}$) and $R_2$, $R_3$, and $R_4$=methyl or benzyl or $R_1$ and $R_2$=alkyl($C_{10}$) and $R_3$ and $R_4$=methyl), dibromonitrilopropioanamide (DBNPA), Dazomet (MITC), tributyl tetradecyl phosphonium chloride (TTPC), halogenated oxidizers, dithiocarbamate, methylene bisthiocyanate (MBT), didecylmethylquat, methylbenzylcocuat, cocodiamine diacetate, cocodiamine, and chlorine dioxide.

Scale inhibitors include polyphosphonates, phosphate esters, nonpolymeric phosphonates and aminophosphonates, polyphosphonates, phosphino polymers and polyphosphinates, polycarboxylates, biodegradable polycarboxylates and polysulfonates. Exemplary anionic scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof. Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Asphaltene dispersants and inhibitors include low molecular weight, nonpolymeric asphaltene dispersants, such as low-polarity nonpolymeric aromatic amphiphiles, sulfonic acid-base nonpolymeric surfactant asphaltene dispersants, nonpolymeric surfactant asphaltene dispersants with acidic head groups, amide and imide nonpolymeric surfactant asphaltene dispersants, and alkylphenols and related asphaltene dispersants; and oligomeric (resinous) and polymeric asphaltene dispersants, such as alkylphenol-aldehyde resin oligomers, polyester and polyamide/imide asphaltene dispersants and asphaltene dissolvers. Exemplary asphaltene treating chemicals include, but are not limited to, fatty ester homopolymers and copolymers (such as fatty esters of acrylic and methacrylic acid polymers and copolymers) and sorbitan monooleate.

Acid stimulation chemicals include corrosion inhibitors for acidizing, nitrogen based corrosion inhibitors, oxygen-containing corrosion inhibitors, including those with unsaturated linkages, corrosion inhibitors containing sulphur, ion control agents, water wetting agents, oil-wetting agents, weak organic acids, weak sandstone-acidizing fluorinated agents, buffered acids, gelled or viscous acids, foamed acids, temperature-sensitive acid-generating chemicals and enzymes and emulsified acids.

Sand control agents include resins and organosilanes.

Anti-fouling agents include napthenate and other carboxylate anti-fouling agents.

Corrosion control agents include film-forming corrosion inhibitors (FFCI's) such as phosphate esters, amine salts of polycarboxylic acids, quaternary ammonium and iminium salts and zwitterionics, amidoimines and imidazolines, amides, polyhydroxy and ethoxylated amines/amides, nitrogen containing heterocycles, sulfur containing compounds and polyamino acids. Exemplary corrosion inhibitors include, but are not limited to, fatty imidazolines, alkyl pyridines, alkyl pyridine quaternaries, fatty amine quaternaries and phosphate salts of fatty imidazolines.

Gas hydrate control agents include thermodynamic hydrate inhibitors (THI's); kinetic hydrate inhibitors (KHI's), such as vinyl lactam KHI polymers, hyperbranched polyester amide KHI's, pyroglutamate KHI polymers and polydialkylmethacrylamide KHI's; anti-agglomerates (AA's), such as emulsion pipeline AA's, hydrate-philic pipeline AA's, natural surfactants and nonplugging oils, gas well AA's and gas hydrate plug removal agents. Exemplary gas hydrate control agents include, but are not limited to, polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Wax (paraffin wax) control agents include wax solvents, thermochemical wax control packages, chemical wax prevention agents, such as wax inhibitors, ethylene polymers and copolymers, comb polymers (methacrylic ester polymers and maleic copolymers), wax dispersants and polar crude fraction flow improvers. Exemplary paraffin inhibitors useful for the practice of the present invention include, but are not limited to, ethylene/vinyl acetate copolymers, acrylates (such as polyacrylate esters and methacrylate esters of fatty alcohols), and olefin/maleic esters.

Demulsifiers include polyalkoxylate block copolymers and ester derivatives, alkylphenol-aldehyde resin alkoxylates, polyalkoxylates of polyols or glycidyl ethers, polyamine polyalkoxylates and related cationic polymers, polyurethanes (carbamates) and polyalkoxylate derivatives, hyperbranched polymers, vinyl polymers, polysilicones, dual-purpose demulsifiers and biodegradable demulsifiers. Exemplary demulsifying agents include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of such di-functional products. Preferred non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide, etc.

Foam control agents include defoamers and antifoamers, such as silicones and fluorosilicones, and polyglycols. Exemplary foaming agents include, but are not limited to, oxyalkylated sulfates or ethoxylated alcohol sulfates, or mixtures thereof.

Flocculants include cationic polymers such as dialkyldimethylammonium chloride polymers, acrylamide or acrylate-based cationic polymers; environmentally-friendly cationic polymeric flocculants; dithiocarbamates; anionic polymers and amphoteric polymers.

Hydrogen sulfide scavengers include nonregenerative $H_2S$ scavengers, such as solid scavengers, oxidising chemicals, aldehydes, reaction products of aldehydes and amines, such as triazines, and metal carboxylates and chelates.

Oxygen scavengers include dithionite salts, hydrazine and guanidine salts, hydroxylamines and oximes, activated aldehydes and polyhydroxyl compounds, catalytic hydrogenation agents, enzymes, sulfided iron reagents, bisulfite, metabisulfite and sulphate salts. Exemplary oxygen scavengers include triazines, maleimides, formaldehydes, amines, carboxamides, alkylcarboxyl-azo compounds, cumine-peroxide compounds, morpholino and amino derivatives, morpholine and piperazine derivatives, amine oxides, alkanolamines, aliphatic and aromatic polyamines.

Drag-reducing agents (DRA's) include oil-soluble DRA's, such as polyalkene (polyolefin) DRA's and polymethacrylate ester DRA's, and water-soluble DRA's, such as polysaccharides and derivatives, polyethylene oxide DRA's, acrylamide-based DRA's and water-soluble surfactant DRA's. Exemplary surfactants include cationic, amphoteric, anionic and nonionic surfactants. Cationic surfactants include those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Amphoteric surfactants include glycinates, amphoacetates, propionates, betaines and mixtures thereof. The cationic or amphoteric surfactant can have a hydrophobic tail (which can be saturated or unsaturated) such as a $C_{12}$-$C_{18}$ carbon chain length. Further, the hydrophobic tail can be obtained from natural oil from plants such as one or more of coconut oil, rapeseed oil and palm oil. Preferred surfactants include N,N,N-trimethyl-1-octadecammonium chloride: N,N,N-trimethyl-1-hexadecammonium chloride; and N,N,N-trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Hydrotesting chemicals include biocides, oxygen scavengers, corrosion inhibitors, dyes and environmentally friendly agents.

Foamers for gas well deliquification can also be used.

Microencapsulant

The microencapsulant can comprise any known polymer material that can form the major portion of a shell or micro-matrix to microencapsulate an oil field chemical. Examples of such materials include, but are not limited to melamine-formaldehyde, urea-formaldehyde, phenol-formaldehyde resin, melamine-phenol-formaldehyde resin, furan-formaldehyde resin, epoxy resin, ethylene-vinyl acetate copolymer, polypropylene-polyethylene copolymer, polyacrylates, polyesters, polyurethane, polyamides, polyethers, polyimides, polyether ether ketones, polyolefins, polystyrene and functionalized polystyrene, polyvinylalcohol, polyvinylpyrrolidone, cellulose and cellulose derivatives, starch and starch derivatives, polysiloxanes, and mixtures thereof.

The materials used to form the shell or micro-matrix can also include non-organic-materials, such as silica, calcium carbonate or inorganic polymers, such as polyphosphazenes. The materials used to form the shell or micro-matrix can be organic/inorganic hybrid materials, such as hybrid silica/polyamide materials.

In addition to shell or micro-matrix forming polymers and inorganic materials, microencapsulants can further comprise emulsifiers and/or stabilisers.

An emulsifier is a surfactant which when present in small amounts facilitates the formation of an emulsion, or enhances its colloidal stability by decreasing either or both of the rates of aggregation and coalescence. [IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.] Emulsifiers can be cationic, anionic and non-ionic. They can be either low molecular weight or polymeric. Example surfactants include mono- and diglycerides of acetic acid, citric acid, lactic acid, fatty acids, monoglycerides, lecithins, sorbitan fatty acid esters, polyoxyethylene sorbitan esters, sodium lauryl sulphate, sodium laureth sulphate, sodium dodecylbenzesulfonate, dodecyl trimethyl ammonium bromide, hexydecyl trimethyl ammonium bromide, etc.

Stabilizers are substances that are added to a system, such as an emulsion, to prevent or retard a change in the system. Some compounds can function as both emulsifiers and stabilizers, and many stabilizers are polymeric. Examples of stabilizers are: homo- and copolymers of polyvinylalcohol, polyvinylpyrrolidone, polyacrylic acid, sodium carboxyl methylcellulose, hydroxylmethylcellulose, hydroxylpropylcellulose, starch derivatives, maleic-anhydride copolymers such as ethylene-maleic-anhydride copolymer, styrene-maleic anhydride copolymers, vinyl acetate-maleic anhydride copolymer, vinyl ether-maleic anhydride copolymer, methyl vinyl ether-maleic anhydride copolymer, octadecyl vinyl ether-maleic anhydride copolymer, an ethylene-vinylacetate copolymer, a polyacrylic acid based copolymer, a polyvinylpyrrolidone based copolymer, a polyacrylate based copolymer, a polyacrylamide, a polyacrylamide based copolymer, and mixtures thereof. Stabilizers known as Pickering stabilisers that comprise organic or inorganic nano or micro particles, can also be used.

Preferably, the polymeric microencapsulant is a melamine-formaldehyde, a urea-formaldehyde, a phenol-formaldehyde resin, a melamine-phenol-formaldehyde resin, a furan-formaldehyde resin, an epoxy resin, a polysiloxane, a polyacrylate, a polyester, a polyurethane, a polyamide, a polyether, a polyimide, a polyolefin, polypropylene-polyethylene copolymers, polystyrene, functionalized polystyrene derivatives, gelatin, a gelatin derivative, cellulose, a cellulose derivative, starch or a starch derivative, a polyvinyl alcohol, an ethylene-vinylacetate copolymer, an ethylene-maleic-anhydride copolymer, a styrene-maleic anhydride copolymer, a vinyl acetate-maleic anhydride copolymer, a vinyl ether-maleic anhydride copolymer, a methyl vinyl ether-maleic anhydride copolymer, an octadecyl vinyl ether-maleic anhydride copolymer, a polyacrylamide, a polyacrylic acid, a polyvinylpyrrolidone, a polyvinylpyrrolidone based copolymer, a polyacrylate based copolymer, a polyacrylamide, a polyacrylamide based copolymer, and mixtures thereof. More preferably, the microencapsulant comprises a vinyl ester, an epoxy resin, polyurethane, a crosslinked polystyrene copolymer, a crosslinked polyacrylate, a melamine-formaldehyde resin, a urea-formaldehyde resin or a phenol-formaldehyde resin.

Bulk Polymer

Bulk polymer refers to one or more polymers that can be combined with a plurality of microcapsules, each containing one or more oil field chemicals, or can be combined with compositions containing microcapsules to obtain a final product in the form of a solid having a shape such as a film, a strip, a bead, etc.

Bulk polymers can be any solid or solid-forming polymer, preferably a thermosetting polymer, a thermoplastic polymer, or a blend thereof. The blends can be a blend of thermosetting polymer with one or more thermosetting polymers, a blend of thermoplastic polymer with one or more thermoplastic polymers, or a blend of one or more thermoplastic polymers with one or more thermosetting polymers. The thermosetting polymers can be an epoxy resin, polyester, polyurethane, an acrylic polymer, a phenol-formaldehyde resin, a melamine-formaldehyde resin or a furan-formaldehyde resin, etc. The thermoplastic polymers can be a polypropylene (isotactic or syndiotactic), a polyethylene, a thermoplastic polyurethane, a polyether, a polyester (such as polyethyleneterephthalate, polybutyleneterephthalate), a polyvinyldifluoroethylene, a polyamide, an acrylic polymer, a polyimide, a polyether ether ketone, cellulose, a cellulose derivative, or a starch, and mixtures thereof. Preferably, the bulk polymer comprises a polyethylene, a polypropylene, a polyacrylate, an aliphatic polyamide (such as nylon-6, nylon-12), a polyurethane, a vinyl ester, an epoxy resin or a polybutylene terephthalate.

Existing commercial polymers can be used as bulk polymers. Bulk polymer can also be formed by polymerization and or crosslinking of monomers, oligomers or prepolymers through processes described below.

Additives

Additives can be used in combination with bulk polymers to incorporate microcapsules and form compositions and articles. Additives include adhesive agents and property improving agents.

Adhesive agents can be any material compatible with the bulk polymer into which the microcapsules can be incorporated that provide additional or improved adhesion between two different materials. Examples include inorganic additives, such as fumed silica and precipitated calcium carbonate, and copolymers such as ethylene-methacrylate copolymers, ethylene-maleic anhydride copolymers, oxidised polyethylene, oxidised polypropylene, acrylate-styrene copolymer, ethylene-acrylate copolymer, propylene-acrylate copolymer, propylene-methacrylate copolymers, propylene-ethylene oxide copolymers, and acrylonitrile-butadiene-styrene copolymers.

Property improving agents are additives added to bulk polymers to improve the properties such as mechanical strength, anti-abrasion, thermal stability of the final compositions and articles. Additives acting as property improving agents include, but are not limited to fillers/extenders, toughening agents, plasticisers, antistatic agents, light stabilisers, heat stabilizers, antioxidants, antimicrobials/biostabilizers, blowing agents, flame retardants, pigments, impact modifiers, lubricants, process aids and reinforcing agents.

One type of preferred additives are inorganic nanoparticles such as fumed silica, aluminium oxide nanoparticles, nano clay such as nano-bentonite, and precipitated calcium carbonate. Other types of preferred additives are carbon nanotubes and carbon fibers. The additive can be selected from the group consisting of a precipitated carbonate, a carbon nanotube, a fumed silica, carbon fiber, or polymeric compatibilizer selected from the group consisting of an ethylene-acrylate copolymer, an ethylene-methacrylate copolymer, ethylene-maleic anhydride copolymers, a propylene-acrylate copolymer, propylene-methacrylate copolymers, oxidised polypropylene, oxidised polyethylene, oxidised propylene-ethylene copolymers, styrene-acrylate copolymers and acrylonitrile-butadiene-styrene copolymers.

Compositions

The compositions and articles described herein are based on a mixture of a bulk polymer with microcapsules encapsulating at least one oil field chemical. A composition comprises: (a) microcapsules comprising an oil field chemical and a microencapsulant, where the microcapsules have an outer surface, and the oil field chemical is contained within the microcapsules and (b) a bulk polymer, where the microcapsules are embedded within the bulk polymer. The microcapsules can comprise: (a) a core comprising an oil field chemical and a first shell comprising a microencapsulant located adjacent to the core, or (b) a matrix comprising an oil field chemical entrapped within a micro-matrix comprising a microencapsulant.

Microcapsules

The microcapsules can comprise at least one of the following structures:

(a) a core shell structure comprising (i) a core comprising at least one oil field chemical and (ii) a shell comprising a polymeric microencapsulant;

(b) a core multi-shell structure comprising (i) a core comprising at least one oil field chemical, (ii) a first shell comprising a polymeric microencapsulant located adjacent to the core; and (iii) one or more additional shells located over the first shell, each additional shell comprising a polymeric microencapsulant that is different than the polymeric microencapsulant in an adjacent shell;

(c) a multi-core shell structure comprising (i) a core comprising a plurality of sub-cores where each sub-core comprises at least one oil field chemical, and optionally having a shell at least partially covering each of the sub-cores, and the sub-cores are dispersed in a non-polymeric compound, and (ii) a shell comprising a polymeric microencapsulant;

(d) a micro-matrix structure comprising a core comprising at least one oil field chemical entrapped within a micro-matrix comprising a polymeric microencapsulant;

(e) a micro-matrix with a shell structure comprising (i) a core comprising at least one oil field chemical entrapped within a micro-matrix comprising a polymeric microencapsulant; and (ii) a shell comprising a polymeric microencapsulant;

(f) a multi-core-micro-matrix with a shell structure comprising (i) a micro-matrix comprising a plurality of sub-cores, where each sub-core comprises at least one oil field chemical, and the sub-cores are entrapped within the micro-matrix, and (ii) a shell comprising a polymeric microencapsulant.

FIG. 1A depicts a core shell structure (1) comprising (i) a core (2) comprising at least one oil field chemical and (ii) a shell (3) comprising a polymeric microencapsulant.

FIG. 1B depicts a core multi-shell structure (10) comprising (i) a core (2) comprising at least one oil field chemical, (ii) a first shell (3) comprising a polymeric microencapsulant; and (iii) one or more additional shells (4) that at least partially cover the first shell.

FIG. 1C depicts a multi-core shell structure (11) comprising (i) a core (12) comprising a plurality of sub-cores (1) each comprising at least one oil field chemical within the sub-core (2) and optionally having a shell (5) at least partially covering the sub-cores, and (ii) a shell (3) comprising a polymeric microencapsulant around the core. The multi-core shell structure can also contain one or more additional shells that at least partially cover the first shell as shown in FIG. 1B as item (4).

FIG. 1D depicts a micro-matrix (13) comprising at least one oil field chemical entrapped within a three-dimensional polymeric microencapsulant (7).

FIG. 1E depicts a micro-matrix with a shell structure (14) comprising (i) a micro-matrix (7) comprising at least one oil field chemical entrapped within the micro-matrix, (ii) a first shell (3) comprising a polymeric microencapsulant, where the first shell at least partially covers the micro-matrix; and (iii) one or more additional shells (4) that at least partially cover the first shell. The structure can have only a first shell (3) and not have one or more additional shells (4).

FIG. 1F depicts a multi-core-micro-matrix with a shell structure (15) comprising (i) a core (12) comprising a micro-matrix (7) comprising a three-dimensional polymeric microencapsulant and a plurality of subcores (9) within the micro-matrix, (ii) a first shell (3) comprising a different polymeric microencapsulant. The structure can also contain one or more additional shells (not shown) that at least partially cover the first shell, as shown as item 4 in FIG. 1E.

The microcapsules, cores and shells are shown graphically in FIGS. 1A-1F as circles for ease of illustration. The microcapsules can have any shape, including, but not limited to a sphere, a rod, an ovoid, a pseudo-cuboid, a ring, etc.

The microcapsules comprise two groups of components: oil field chemicals and microencapsulants. Microencapsulants comprise organic polymer and/or inorganic materials. The microencapsulant can further comprise emulsifiers, stabilisers or both. The microencapsulant can form shells and/or a micro-matrix in a microcapsule. The oil field chemicals are contained by the microencapsulants. The oil field chemical can be present at 1 to 99.5% by weight of the microcapsule. Preferably the oil field chemical is present at 10 to 98% by weight of the microcapsule. In one aspect of the invention, the oil field chemicals or their mixtures with non-polymeric compounds form cores, sub-cores or multi-cores. The oil field chemicals can be present at 2 to 100% by weight of the total core or micro-matrix in a microcapsule. Preferably the oil field chemicals are present at 5 to 100% by weight of total weight of the cores.

In another aspect of the invention, individual molecules of oil field chemicals can be distributed in micro-matrixes or shells. The composition can comprise microcapsules comprising a core that is a simple core or a multi-core, or a micro-matrix. The composition can comprise microcapsules comprising two or more shells, where each shell comprises a polymeric microencapsulant that is different than the polymeric microencapsulant in an adjacent shell. The composition can comprise microcapsules comprising two or more shells, where one or more shells comprise an additive or an oil field chemical.

In one aspect of the invention, the microcapsules comprise one or more shells. Microcapsules having core-multi-shell, micro-matrix-shell, or micromatrix-multi-shell structures can have additional shells. These additional shells can comprise a microencapsulant that is either the same as, or different than, the microencapsulant in the first shell or the micro-matrix. For microcapsules with one or more shells, the outer surface of the outer shell of the microcapsule is the outer surface of the microcapsule. In another aspect of the invention, the microcapsules comprise micro-matrices without shells. For these microcapsules, the outer surface of the micro-matrices is the outer surface of the microcapsules. The outer surface of the microcapsule is part of the microcapsule. The composition can comprise microcapsules where the outer surface of the microcapsule is not reactive with the bulk polymer. The composition can comprise microcapsules where the outer surface of the microcapsule comprises one or more groups that are reactive with the bulk polymer.

One or more oil field chemicals are present within a microcapsule. Additional shells can be present in core-shell, multi-core-shell, core-multi-shell, micro-matrix-shell or micro-matrix-multi-shell structures. These additional shells can comprise oil field chemicals that are either the same or different from the oil field chemicals in the core, multicores, first shell or the micro-matrix. Preferably, the oil field chemicals in all the shells in a microcapsule can account for 0-49.5% by weight of the total amount oil field chemicals in a microcapsule. More preferably the oil field chemicals in all the shells account for 0-30% by weight of the total oil field chemicals in a microcapsule.

The microencapsulant can be present at 10-100% of the mass of the shells. Preferably, the microencapsulant is present at 20-100% of the mass of the shells. The microencapsulant can be present at 0.2 to 95% by weight of the total composition. Within the microcapsules, the shells can account for 0.5-95% by weight of the total weight of the microcapsules and the cores account for 5-99.5%, by weight of the total weight of the microcapsules.

The microcapsules can have a volume weighted average particle size of between 0.05 µm and 600 µm, inclusive. Preferably the average particle size is between 0.1 µm and 500 µm, inclusive. The size of the microcapsules can be determined by a laser diffraction technique using a Malvern or Sympatec instrument. This method measures the volume weighted diameter of sphere particles directly. For non-spherical particles, volume equivalent spherical diameter is measured. Mean (arithmetic average), mode (most frequent) or median (where 50% of the population is below/above) values may be taken as representative particle size of a population. As used herein, the measured volume weighted mean diameter of the microcapsules is taken as the representative particle size of the microcapsules.

In one aspect of the invention, the microcapsules can comprise microencapsulants that provide one or more functional groups at the outer surface of the microcapsules that can react with the bulk polymers. The functional groups can be carboxylates, amines, anhydrides, hydroxyls, isocyanates, phosphates, nitriles, esters, aldehydes, N-methylol, silanol etc.

In a further aspect of the invention, the microcapsules can comprise microencapsulants that provide one or more functional groups at the outer surface of the microcapsules that will allow for strong physical interaction (e.g. dipole-dipole interaction and hydrogen bonding etc.) between the surface of the microcapsules and the bulk polymers. The functional groups may not react with the bulk polymers. The oilfield chemicals do not chemically react with the microencapsulant or bulk polymer.

In another aspect of the invention, a composition comprises (a) microcapsules, (b) a bulk polymer and (c) optionally one or more additives, where the microcapsules are embedded, preferably homogeneously, in the bulk polymer, where the microcapsules comprise a core and at least a shell, a micro-matrix, or a micromatrix with one or more shells, where the core or micro-matrix comprise at least one oil field chemical, and the shell at least partially covers the core or micro-matrix. The bulk polymeric material can account for 20-98% by weight of the total weight of the composition. The microcapsules can account for 2-80% by weight of the total weight of the composition. The one or more additives can account for 0-30% by weight of the total weight of the composition. The composition can further comprise one or more bulk polymers and/or one or more additives. Additives include (a) adhesive agents and (b) property improving agents. Additives can be used in combination with bulk polymers to incorporate microcapsules into the bulk polymers and in forming compositions and articles. Property improving agents can be distributed within the bulk polymers. Adhesive agents can be present at the surface of the microcapsules and/or in the bulk polymeric material.

In one aspect of the invention, the composition can comprise one or more oil field chemicals that are located outside the microcapsules and are distributed in the bulk polymers. These oil field chemicals can be the same or different than the oil field chemicals in the microcapsules. Oil field chemicals outside the microcapsules that are located in the bulk polymer can account for 0-49.5% by weight of the total oil field chemicals in the whole composition. More preferably the oil field chemicals outside the microcapsules in the composition account for 0-30% by weight of the total oil field chemicals in the whole composition.

The bulk polymer can account for 55-100% by weight of the bulk polymer, adhesive agents, property improving agents and oil field chemicals present in the bulk polymer. Preferably the bulk polymers account for 70-100% by weight of the composition excluding the weight of the microcapsules.

The combinations of bulk polymers, adhesive agents and property improving agents can account for 0-95% by weight of the whole composition. Preferably the combination of bulk polymers, adhesive agents and property improving agents can account for 20-90% by weight of the whole composition.

The oil field chemical can be present at 0.5 to 99.5% by weight of the total weight of the composition. Preferably, the oil field chemical is present at 5-70% of the total weight of the composition.

Multi-Micro-Reservoir Structure

The compositions provided by this invention form a multi-level physical structure. Bulk polymers in combination with additives form a matrix of predominantly bulk polymers. This matrix is present on macro scale, with the matrix being no less than 400 micrometers in at least one dimension. The microcapsules are incorporated into the composition. No less than 50.5% of total oil field chemicals within the composition are located inside the microcapsules.

In a composition having the oil field chemicals simply mixed with, and distributed into, the bulk polymer, the oil field chemical is more highly dispersed throughout the bulk polymer with a less distinct boundary due to lack of restriction, compared to a mixture of microencapsulated oil field chemicals in a bulk polymer, where the oil field chemicals are present at high concentration in the microcapsules compared to the bulk polymer. Isolated micro-matrices are not formed when oil field chemicals are mixed into bulk polymers.

In the compositions provided by this invention, the microcapsules can be evenly dispersed in bulk polymers in a microcapsule. In some compositions, the microcapsules can be non-uniformly dispersed. As a result of embedding preformed microcapsules into bulk polymers, the compositions of the present invention are much more heterogeneous microscopically with a distinct boundary due to the restriction provided by the structure of microcapsules. Higher concentrations of oil field chemicals are present within the microcapsules than outside the microcapsules. For compositions comprising microcapsules with shells, the segregation by the shells is obvious. In compositions comprising embedded microcapsules having a micro-matrix structure in bulk polymers, the oil field chemicals are confined in the micro-matrixes. It is also one aspect of the invention that the polymeric materials that form the micro-matrixes (FIG. 1d) can be different and less permeable than the bulk polymers used for the composition. The micro-structure of the microencapsulant can be different than that of the bulk polymers in the macro-matrix. The microcapsules can also have various complex structures (from core-shell to core-multi-shell to multicore-shell, and from micro-matrix to micro-matrix-shell to multi-core-micro-matrix-shell). Thus the compositions of this invention have a multi-level structure with hierarchy. From a different point of view, with reference to oil field chemicals, each microcapsule is a micro-reservoir. The compositions of the present invention form a multi-micro-reservoir structure.

The multi-micro-reservoir structure favours the controlled and sustained release of the oil field chemicals within the microcapsule. In order to be released, the microencapsulated oil field chemicals have to move through two distinct compositions: from within microcapsules into the bulk polymer, and then from the bulk polymer to the surrounding fluids in the targeted hydrocarbon reservoir. The shells and/or micro-matrices of the microcapsules, which can be more dense and impermeable than the bulk polymers within the composition by design, will form the first barriers to the release of the oil field chemicals from within microcapsules. Such a first barrier does not exist in compositions where the oil field chemicals are directly distributed in bulk polymers. Compositions in which the oil field chemicals are present in microcapsules are expected to provide for the slow and controlled release of the oil field chemicals.

The synergistic sustained and controlled release of the oil field chemicals can be further enhanced by the adhesion between the microencapsulant and the bulk polymer phase through physical interaction and chemical reaction.

Composition Formation

Overall, the composition can be manufactured in a 2 step process. In the first step, microcapsules containing oil field chemicals are prepared. In the second step, the microcapsules are incorporated into bulk polymers. The step-by-step manufacturing process used in manufacturing the compositions of the present invention allows for the formation of the multi-level multi-micro-reservoir structure described above.

The step of forming a plurality of microcapsules can comprise a physical method, a chemical method or a physico-chemical method. The physical method can be selected from the group consisting of spray drying, fluidised bed coating, co-extrusion, and solvent evaporation.

It is preferred that microcapsules are made by spray drying a mixture of oil field chemicals and polymers.

In another preferred method, microcapsules containing oil field chemicals are made by co-extrusion of two phases of polymers or mixture of polymers. An inner phase is a mixture of a polymer or prepolymer containing oil field chemicals. An outer phase is a mixture of a polymer or prepolymer containing either no oil field chemicals or less oil field chemicals than are present in the inner phase.

Microcapsules can be formed by chemical methods using one or more in-situ reactions. A preferred chemical method of this invention forms microcapsules by the in-situ polymerization of monomers distributed in an emulsion containing one or more oil field chemicals. The term "emulsion" is used to describe a fine dispersion of one liquid in a second liquid in which the first liquid is not soluble or miscible. The term emulsion includes a microemulsion, a microsuspension, a mini-emulsion as well as a normal emulsion and suspension. An emulsion can be a discontinuous internal oil phase in a continuous water phase (O/W) or internal water phase in oil phase (W/O). The emulsion can be more complicated with an internal phase itself being a dispersion, such as a W/O/W or O/W/O type of emulsion. The polymerisation can occur in the water phase, the oil phase, the interphase between water and oil phases, more than one of these phases or in all of these phases. Thus the polymerisation can be termed emulsion polymerisation, miniemulsion polymerisation, microemulsion polymerisation, suspension polymerisation, micro-suspension polymerisation, colloid polymerisation, interfacial polymerisation, etc. The polymerisation can be either addition polymerisation, such as with the use of vinyl monomers, or condensation polymerisation, such as with the use of corresponding monomers and prepolymers. Initiators and/or catalysts and heating or high energy irradiation (e.g. UV) may be used. Examples of condensation polymers are melamine-formaldehyde resin, phenol-formaldehyde resin, urea-formaldehyde resin, epoxy resin, urethane/urea resin, polyester resin etc. Examples of vinyl monomers are acrylamide, acrylic acid, acrylic esters, methacrylic acid, methacrylic esters, styrene, 4-vinylbenzyl chloride, divinylbenzene, methylenebisacrylamide, etc.

Microcapsules with core shell structures can be prepared by dispersing an oil field chemical, a mixture of an oil field chemical with non-polymeric materials, or a mixture of an oil field chemical with non-polymeric materials and monomers into small particles in the form of an emulsion with the aid of physical force and emulsifiers. Stabilizers can be used to stabilize the emulsions when they are formed. Monomers or prepolymers can be distributed in the interphase, the continuous phase or in both phases. The monomers can be polymerised and deposited on the cores or other shells to form the shells. A pre formed polymer can also be added to the emulsions and deposited together with newly formed polymers to form the shells. The polymer can be cured during or after the polymerisation process. Alternatively, monomers or prepolymers can be deposited on the core and then the prepolymers can be cured to form a polymer coating. Oil field chemicals can also be added to the continuous phase. Overall, more oil field chemicals are present in the dispersed internal phase than in the continuous phase.

Micro-matrix type microcapsules can also be formed by polymerisation from emulsions. A mixture of oil field chemicals with a high concentration of monomers, prepolymers, a combination of monomers and prepolymers, or a combination of monomer/prepolymer and a preformed polymer, can be dispersed to form an emulsion. Polymerisation and/or curing (crosslinking) of monomers inside droplets or a dispersed internal phase can form a micro-matrix containing oil field chemicals. During this process, the structure of the mixture will undergo changes. For example, at the beginning of the process, the oil field chemicals are molecularly distributed, however at the end of the process, they can form very fine phases in the microcapsules or can still be molecularly distributed.

The physico-chemical method can be coacervation phase separation.

By using one of the methods or combinations of the above methods, microcapsules containing oil field chemicals with structures specified above can be made.

Micro-matrixes, core shell particles or micro-matrixes with shells can be prepared beforehand. These micro particles can then be exposed to gas or liquid oil field chemicals or mixtures of oil field chemicals with non-polymeric compounds and the oil field chemicals can be absorbed and/or adsorbed by the microparticles.

Microcapsules can be recovered as solid powders using methods include centrifugation and/or filtration followed by drying. Drying methods can include evaporation of solvent or water in the air, drying in a vacuum oven or fluidised bed, etc.

Both solid and liquid oil field chemicals can be microencapsulated and recovered as solid powders. The oil field chemicals can have different properties such as density, chemical nature, particle size distribution and surface properties in the case of solid oil field chemicals. These powders can be incorporated into bulk polymers. The microencapsulation can also provide protection to the oil field chemicals. Thus this invention provides a means to process liquid and solid oil field chemicals into compositions with sustained and controlled release properties.

In one aspect of the invention, a composition having two or more different microencapsulants can be formed by microencapsulating a microcapsule with a core shell structure, micro-matrix structure or a micro-matrix-shell with one or more microencapsulants. As such, a double shell or different micro-matrix-shell structure or micro-matrix-double shell structure can be formed.

Besides double microencapsulation, microcapsules can be treated after they are formed. The treatment can be physical or chemical. For example, one or more different chemicals can be added to the emulsion system after the formation of the microcapsules. In such treatments, no additional shell is formed. Rather the surface properties of the microcapsules are altered due to adsorption or reaction at the outer surface of the pre-formed microcapsules. The chemical can have physical interaction, such as deposition, or chemical reaction with first formed shells or micro-matrixes. As such, the properties of the microencapsulant can be modified for example to allow different chemical groups to become attached to the outer surface of the microcapsules or to enhance the stability or barrier properties of the microencapsulant. One particular chemical treatment is grafting of new polymers onto the surface of the microcapsules.

By microencapsulating oil field chemicals and post-treating the microcapsules using the above methods, microencapsulated oil field chemical with various functional chemical groups can be prepared. The functional chemical groups can be reactive. Examples of such chemical groups can be selected from the group consisting of carboxylates, amines, quaternised amine, anhydrides, hydroxyls, isocyanates, phosphates, nitriles, esters and aldehydes, silanol, N-methylol etc.

Incorporation of Microcapsules into Bulk Polymers

A method of making a composition comprising: (a) microcapsules comprising an oil field chemical and a microencapsulant, where the microcapsules have an outer surface, and the oil field chemical is contained within the microcapsules and (b) a bulk polymer, where the microcapsules are embedded within the bulk polymer, comprises providing the microcapsules and embedding the microcapsules within the bulk polymer. The microcapsules can have at least one of the structures described above and shown in FIG. 1. The method can further comprise the step of forming a plurality of microcapsules, where each microcapsule comprises an oil field compound and one or more polymeric microencapsulants, where the microcapsule comprises at least one of the structures described above and shown in FIG. 1. The method can further comprise forming the mixture of the microcapsules and the bulk polymer into a shaped article.

Microcapsules containing an oil field chemical are incorporated into bulk polymers to form a composition. A composition can comprise (a) microcapsules containing an oil field chemical, (b) a bulk polymer into which the microcapsules are homogeneously dispersed and embedded in and (c) optionally one or more additives. The bulk polymeric material can account for 20-98% by weight of the total mass of the composition. The microcapsules can account for 2-80% by weight of the total mass of the composition. The one or more additives can account for 0-30% by weight of the total mass of the composition.

The bulk polymer(s) used in the composition can be a commercially available polymer. The bulk polymer(s) can also be formed by direct polymerization of monomers or curing of prepolymers during the manufacture of the compositions.

One or more additives can be added to the bulk polymers to help incorporate the microcapsules into various compositions and articles.

Oil field chemicals that have not been microencapsulated can be added to the bulk polymers during the process to incorporate the microcapsules into the bulk polymers.

The compositions can be formed by any of a variety of known processes including, but not limited to, processes with various level of mechanical force and shearing at different temperatures and pressures. Examples of these processes include mechanical stirring, compounding, extruding through a twin screw, a single screw compounder/extruder, casting, and injection moulding, including reaction injection moulding, which involves the rapid polymerisation of monomers/prepolymers around the oil field chemical, high speed dispersing using equipment with a rotor, a rotating mixer, or other method known in the art.

Compositions can be made by compounding or blending particles comprising microencapsulated oil field chemicals with polymers and additives at the processing temperature of the bulk polymers, i.e., a temperature close to or above the melting point or glass transition of the bulk polymers. The compounding can be carried out through a single or twin screw compounder and/or extruder.

Compositions can also be made by mechanically dispersing particles comprising microencapsulated oil field chemicals with monomers and/or prepolymers and initiators or curing agents. A high or low shear mixer, such as a simple mechanical stirrer, or equipment such as a Silverson Disperx stirrer can be used. The mixture can be cast or moulded, and then polymerized or cured subsequently by changing the temperature and/or leaving the composition to stand for a sufficient period of time to allow curing.

In another preferred process, compositions can be made by mixing or blending microencapsulated particles comprising oil field chemicals with polymers, additives and a dispersing solvent at low temperature. Examples of dispersing solvents are water and acetone. A high or low shear mixing machine, such as a simple mechanical stirrer, or equipment such as a Silverson machine, or a Disperx stirrer can be used. The mixture can then be cast or moulded. A final composition can be obtained by evaporating the dispersing solvents.

The above described process can be used individually or in combination.

Reactions in the Process to Incorporate Microencapsulated Particles into Bulk Polymer(s)

During the process of manufacturing the composition, no reactions occur that form chemical bonds between the oil field chemicals and any polymers used in making the composition. However, reactions among any components of the composition other than the oil field chemicals, are not excluded.

The microcapsules can be incorporated into bulk polymers by physical processes such as mixing and blending. During these processes, conditions such as temperature and pressure are controlled. In this way reactions between the bulk polymers and the oil field chemicals are not expected to occur.

The compositions can comprise microcapsules where the outer surfaces of the microcapsules are not reactive with the bulk polymer. The compositions can comprise microcapsules where the outer surfaces of the microcapsules comprise one or more reactive groups that are reactive towards the bulk polymer. The reactive groups can be selected from the group consisting of carboxylates, amines, anhydrides, hydroxyls, isocyanates, phosphates, nitriles, esters, aldehydes, silanols, N-methylol, etc. The composition can comprise one or more chemical groups on their surface that are reactive towards the bulk polymer, where the reactive groups are selected from the group consisting of carboxylates, amines, anhydrides, hydroxyls, isocyanates, phosphates, nitriles, esters, aldehydes, silanols and N-methylol.

During the process of incorporating microcapsules into the bulk polymers, reactions between the polymeric microencapsulant and the bulk polymers can occur.

Articles

The composition can be formulated for use in a hydrocarbon reservoir. The composition can be in the form of an article configured for placement in a hydrocarbon reservoir. The article can be in any one of a variety of shapes including a rod, a bar, an oval, a cuboid, a strip, a strand, a disc, a button, a block, a cylinder, a flat piece, a net, and a film. The shape of the article can be modified to adjust the surface area of the articles that will be exposed to reservoir fluids. For example, a bar or strip can contain one or more grooves to increase the surface area of the article. The grooves can have any number of shapes, preferably V-shaped or semi-circular. Preferably, the objects are >400 micrometer in at least one dimension.

The articles can be formed as part of the process that forms the composition, i.e., a forming process coupled with the process to incorporate microcapsules into bulk polymers. For example, in an injection moulding process, the microcapsules, the bulk polymer forming prepolymers or monomers, initiators or curing agents and additives can be mixed directly at a mould.

The articles can also be formed in one or more steps after the composition is formed. For example, a composition comprising microcapsules and bulk polymers/additives can be prepared through a compounding process to form the composition in a twin extruder. The compounded materials can then be processed through a single screw extruder to form articles such as strips, bars, rods, films or rolls. The strips, bars, rods, films and rolls may be further granulated to form balls, granules, etc.

The articles comprise a mixture of microcapsules comprising one or more oil field chemicals and one or more bulk polymers, where the articles have a defined shape. The articles can be formed by any of a variety of known processes including, but not limited to compounding, extruding, thermo-forming, non-thermo forming, casting, and injection moulding, including reaction injection moulding, which involves the rapid polymerisation of monomers/prepolymers around the oil field chemical. Some preferred processes are described below.

The articles can be thermoformed by extruding a mixture comprising microcapsules containing one or more oil field chemicals within the microcapsules and one or more bulk polymers through a single or twin screw compounder and/or extruder. Articles can be formed into the desired shapes by casting a mixture of the microcapsules, adhesive agents, embedding prepolymers, additives and initiators or catalysts into a mould and polymerizing the mixture. Articles can also be formed into the desired shapes by casting mixtures of the microcapsules, adhesive agents, embedding polymers and additives or prepolymers and initiators or catalysts, additives, and solvent into a mould, allowing the solvent to evaporate, and/or polymerizing the mixture. Articles can also be formed into the objects of the desired shapes by casting the microcapsules, adhesive agents, embedding prepolymers, additives and initiators or catalysts onto the location where the article is desired to be fixed, and polymerizing the article in-situ.

Microencapsulated tracers and well treatment agents can be formed into articles comprising various bulk polymers such as epoxy resins, vinyl ester resin, polyurethanes, polyesters, acrylic polymers or acrylonitrile-butadiene-styrene, as described above. Preferably the compositions and articles are solid and are in the shape of a rod, a bar, an oval, a cuboid, a strip, a strand, a disc, a button, a cylinder, a bead, a ball, a block, a flat piece, a film or a net. Articles produced by casting can contain the oil field chemicals in amounts of up to 70% by weight of the article.

Articles can be made by a process comprising the following steps: (a) blending the microcapsules with adhesive agents, embedding polymers and additives to form a mixture, and (b) forming the mixture into one or more shaped objects. The process can further comprise one or both of the following steps: formulating and/or pre-treating one or more oil field chemicals, and forming a plurality of microcapsules, where each microcapsule particle comprises a core comprising at least one oil field chemical, and at least one shell that at least partially covers the core.

Articles can also be made by a process comprising the following steps: (a) blending the microcapsules and adhesive agents together with embedding prepolymers and/or monomers, additives and initiators or catalysts, and (b) forming the mixture into one or more shaped objects. The process can further comprise one or both of the following steps: formulating and/or pre-treating one or more oil field chemicals, and forming a plurality of microcapsules, where each microcapsule particle comprises a core comprising at least one oil field chemical, and at least one shell that at least partially covers the core.

Articles can also be made by a process comprising the following steps: (a) blending the microcapsules and adhesive agents together with an embedding polymer, or prepolymers and/or monomers, additives and initiators or catalysts, and solvents, (b) forming the mixtures into one or more shaped objects. The process can further comprise one or both of the following steps: formulating and/or pre-treating one or more oil field chemicals, and forming a plurality of microcapsules, where each microcapsule particle comprises a core comprising at least one oil field chemical, and at least one shell that at least partially covers the core.

A hydrocarbon reservoir monitoring system can comprise a composition comprising: (a) microcapsules comprising an oil field chemical and a microencapsulant, where the microcapsules have an outer surface, and the oil field chemical is contained within the microcapsules, and (b) a bulk polymer, where the microcapsules are embedded within the bulk polymer. The compositions can be placed at various locations in a hydrocarbon reservoir and/or a well penetrating the reservoir. The hydrocarbon reservoir monitoring system can further comprise a means of obtaining a sample of a fluid from a hydrocarbon reservoir. Means of obtaining samples or a sample of a fluid from a hydrocarbon reservoir are well known to one of ordinary skill in the art. The means include devices that can manually or automatically collect samples from the fluid produced from the well penetrating the reservoir.

Preparation of Articles from Microencapsulated Solid or Liquid Oil Field Chemicals of Different Physical States and Properties and Homogeneity of the Final Articles The methods described herein were used to formulate both solid and liquid oil field chemicals having different properties, such as density and reactivity, into final articles that could be deliverable to hydrocarbon reservoirs. This is shown in the Example cited below.

Tracers having different physical states and properties and a biocide were separately microencapsulated into powders. These powders were incorporated into bulk polymers (epoxy resin, polybutylene terephthalate or polypropylene) to form articles that were evaluated to determine their release properties. The properties of these articles were compared with comparable articles in which the pure tracer or the biocide (not in a microencapsulated form) were mixed with a bulk polymer.

Pure tracer was incorporated into epoxy resin and cast into articles in the shape of solid cylinders (Comparative Example 1, 3, 9-12). Attempts to cast cylinders from pure tracer D and epoxy resin failed due to tracer D being a heavy liquid with a density of 2.0 g/cm³ and there being little adhesion between the epoxy resin and the tracer (Comparative Example 12). When pure biocide A was mixed with epoxy resin and cured at 60° C., a dark brown/black colour was observed (Comparative Example 11). It was determined that the colour was caused by reaction between the biocide and epoxy resin. The reaction destroyed the biocide and made the biocide un-releasable. Such a cylinder was not a sustained release composition.

Tracer D and biocide A were readily microencapsulated and free flowing solid powders comprising microcapsules containing the tracer or the biocide were recovered (Examples 11, 13). The powders were easily dispersed in epoxy resin and the microcapsules were preserved during curing of the resin. There was good adhesion between the microcapsules and epoxy resin due to physical interaction and reaction between the chemical groups at the outer surface of the microcapsules (carboxylate, N-methylol and amine) and epoxy resin. These cylinders provided for the sustained release of tracer from the microcapsule (Examples 12, 14). The cylinder made of microencapsulated biocide A and epoxy resin showed only very light yellow colour coming from the biocide itself, indicating the reaction between the biocide and epoxy resin was prevented.

Tracers A, B and C were solids at room temperature but each of these tracers had different densities. Each of these tracers was able to be mixed with epoxy to form cylinders. However, significant inhomogeneity was seen in the cast cylinders (Comparative Examples 1, 3, 9, 10). Tracers A and C tended to settle to the bottom of the cylinders due to their high densities. Fumed silica, a commonly used thickener, was used in some of the compositions to aid in improving the distribution of the tracer in the articles (Comparative Examples 3 and 4) but resulted in limited success.

Tracers A, B and C were microencapsulated and free flowing powders were obtained (Examples 1, 4, 7). The free flowing powders were readily formulated with epoxy resin and good adhesion between the microcapsules and epoxy resin prevented settling of the particles during the curing process. Cylinders having high homogeneity throughout were cast from these microencapsulated tracers (Example 2, 15, 16). These cylinders provided for the sustained release of the encapsulated tracer.

| Oil field chemicals | Tracer A | Tracer B | Tracer C | Tracer D | Biocide A |
|---|---|---|---|---|---|
| Physical States of Oil field chemicals at Room Temperature | Solid | Solid | Solid | Liquid | Solid |
| Density of Oil field chemicals at Room Temperature, g/cm³ | 2.4 | 1.2 | 3.0 | 2.0 | ~1.3 |
| Availability in Casting Pure Oil field chemicals with Epoxy Resin | Yes | Yes | Yes | No, due to liquid state | No, due to reactivity |
| Dimensional Homogeneity of Pure Oil field chemicals/Epoxy Resin Cast Pieces | No, due to tracer settling | Yes | No, due to tracer settling | N/A | N/A |
| Integrity of Pure Oil field chemicals/Epoxy Resin Cast Pieces During Long Term Elution | No | Not tested | Not tested | N/A | N/A |
| Microencapsulation into Powders | Yes | Yes | Yes | Yes | Yes |
| Availability in Casting Microencapsulated Oil field chemicals with Epoxy Resin | Yes | Yes | Yes | Yes | Yes |
| Dimensional Homogeneity of Microencapsulated Oil field chemicals/Epoxy Resin Cast Pieces | Yes throughout | Yes throughout | Yes throughout | Yes throughout | Yes throughout |
| Integrity of Microencapsulate Oil field chemicals/Epoxy Resin Cast Pieces During Long Term Elution | Yes | Not tested | Not tested | Not tested | Not tested |

When tracer A was formed into a cylinder using epoxy resin, the cylinder had a high degree of inhomogeneity due to settling of the tracer. The addition of fumed silica delayed settling and resulted in a more homogeneous product. A product obtained by casting microencapsulated tracer A with epoxy resin was the most homogeneous.

A cylinder cast from microencapsulated tracer A showed a very light yellow/brown colour caused by the distribution of a small amount of free tracer into epoxy resin. The very light colour of microencapsulated tracer/epoxy resin is a sign that most of the tracer remained concentrated inside the microcapsules within the cast epoxy. This is in agreement with the concept of a multi-micro-reservoir structure existing in the compositions and articles of this invention.

Cast cylinders with tracer A and epoxy resin were placed in different eluents at 60° C. Better mechanical integrity of cast cylinders was obtained by microencapsulation of the tracer and mixing the microcapsules with epoxy resin. In toluene at 60° C. (simulating high aromatic light oil at a temperature representative of a hydrocarbon reservoir), cylinders made of (a) pure tracer A/epoxy and (b) pure tracer A/fumed silica/epoxy resin both showed cracks after about 5 days and 2 weeks, respectively (Comparative Example 2 & 4). However, the microencapsulated tracer A/epoxy cylinder remained intact after 4500 hours in toluene (Example 2).

The improved integrity in the microencapsulated tracer A/epoxy resin cylinder indicates there is good adhesion between the shells of the microencapsulated tracer and the epoxy resin due to physical interaction and chemical reaction between chemical groups at the outer surface of the microcapsules and epoxy resin. The combination of the physical interaction and the chemical reaction between the outer surface of the microcapsules and the epoxy resin, with the multi-micro-reservoir structure of the microencapsulated particles, makes the microencapsulant a more effective barrier for microencapsulated oil field chemicals to release than the microcapsules are used alone, thus helps to achieve synergistic control and sustained release shown below.

As further examples, microencapsulated tracers B and C were compounded with bulk polymers to form articles in the form of strips that provided for sustained release of the tracers when the strips were eluted in a synthetic oil.

Release of Oil Field Chemical from Compositions and Articles

The various compositions and articles described herein provide different release rate profiles as shown below in the Examples. While there is no industry accepted standard method for testing release rates, one of ordinary skill in the art would recognize that typical dissolution type testing at elevated temperatures representing those found in a hydrocarbon reservoir using an eluent representative of an oil can be used. Typical dissolution type testing involves placing a material containing a compound of interest into an eluent with stirring, taking samples of the eluent at various times and determining the amount of the compound of interest that is present in the eluent over time. From this information, a graph of the cumulative amount of the compound of interest released over time can be produced. Comparisons of length of time needed to release a desired amount of compound of interest can be made based on the profile of the data.

The release profile can be dependent on the eluent selected. For most oil tracers, the lower the molecular weight and/or the more aromatic the eluent is, the faster the release of the tracer into the eluent will be. For example, using a low molecular weight aromatic compound, such as toluene, as an eluent usually results in the rapid release of organic soluble tracers. However, in real oil, e.g. crude oil or synthetic oil, the release rate can be much lower. While synthetic oil can be used to simulate the release of tracers to crude oil, material having a higher aromatic content, such as toluene, can be used in rapid screening.

Examples 1-2 and 10 show that under conditions in a dissolution test performed at 60° C. using an eluent that simulates reservoir fluid that the following compositions provided the following releases:

| Composition | Eluent | Release |
| --- | --- | --- |
| Pure Tracer | Synthetic Oil | 100% in about 2 minutes |
| Encapsulated Tracer | Synthetic Oil | About 50% in about 4-5 hours |
| Pure Tracer in Bulk Polymer | Toluene | About 30% in about 43 hours (1.8 days) About 50% in about 100 hours (4 days) and About 90% in about 714 hours (30 days) |
| Encapsulated Tracer in Bulk Polymer | Toluene | About 20% in about 115 hours (68 days) and About 30% in about 3285 hours (136 days) |
| Encapsulated Tracer in Bulk Polymer | Synthetic Oil | About 0.1% in 4500 hours (187 days) |

The release of the microencapsulated tracer was approximately linear over time, indicating that the release rate is relatively constant and highly controlled. This is an important feature that is in demand by the industry. The controlled release of the tracer is a result of the presence of a multi-micro-reservoir structure in the compositions and articles of the current invention. Both the bulk polymer and the shell encapsulating the oil field chemicals provide barriers that resist the infiltration of reservoir fluids into the core, retarding the release of the oil field chemicals. As is shown below, the retardation of the release of the oil field chemicals from articles described herein is much greater than expected from the combination of the two barriers based on the combined individual release rates. This effect can be considered to be synergistic. The multitude of micro-reservoirs of oil field chemicals in the compositions ensures a consistent sustained release of the compounds from the articles over time.

Surprisingly, the combination of the encapsulated tracer in the bulk polymer greatly slows the release of the tracer. It was unexpected that the combination of the encapsulated tracer in the bulk polymer would slow the release of the oil tracer so that only less than 0.1% of the total tracer was released over 187 days of time in synthetic oil, especially when the encapsulated tracer provided about 50% release over a period of only 4-5 hours and the combination of the tracer in the bulk polymer provided about 30% release in about 1.8 days. Even in toluene, one of the fastest eluting eluents, only about 20% and 30% of the applied microencapsulated tracer was released over about 68 and 136 days, respectively.

The articles described herein can provide for the release of an oil field chemical into eluents representative of oil under the test conditions described herein such that measureable concentrations of the oil field chemical can be obtained in the eluent for at least 6 months, preferably at least 9 months, more preferably at least 1 year, even more preferably at least 15 months, particularly at least 18 months, more particularly at least 21 months, even more particularly at least 2 years, especially at least 27 months, more especially at least 30 months, even more especially at least 33 months, and most preferably at least 2 years after the article has been placed in the test system.

The articles described herein can provide release of the oil field chemical into eluents representative of oil (or reservoir fluid) under the test conditions described herein such that ≤ about 45%, preferably ≤ about 40%, more preferably ≤ about 35%, even more preferably ≤ about 30%, particularly ≤ about 25%, more particularly ≤ about 20%, even more particularly ≤ about 15%, especially ≤ about 10%, more especially ≤ about 5%, or even more especially ≤ about 1% of the applied oil field chemical is released into the eluent over about 68 days.

The articles described herein can provide release of the oil field chemical into eluents representative of oil under the test conditions described herein such that ≤ about 30%, preferably ≤ about 25%, more preferably ≤ about 20%, even more preferably ≤ about 15, particularly ≤ about 10%, more particularly ≤ about 5%, or even more particularly ≤ about 1% of the applied oil field chemical is released into the eluent over about 136 days.

The articles described herein can provide release of the oil field chemical into eluents representative of oil under the test conditions described herein such that that ≤ about 20%, preferably ≤ about 15, more preferably ≤ about 10%, even more preferably ≤ about 5%, particularly ≤ about 1% or more particularly ≤ about 0.5% of the applied oil field chemical is released into the eluent over about 180 days.

Preferably, the articles described herein can provide release of the oil field chemical into eluents representative of oil under the test conditions described herein such that that less than 50% of the oil field chemical can be released into the eluent over a period at least 6 months, preferably at least 9 months, more preferably at least 1 year, even more preferably at least 15 months, particularly at least 18 months, more particularly at least 21 months, even more particularly at least 2 years, especially at least 27 months, more especially at least 30 months, or even more especially at least 33 months after the article has been placed in the test system. Some articles can provide for the release of an oil field chemical for preferably at least 2 years, more preferably at least 5 years, even more preferably at least 10 years, at least 15 years or most preferably more than 20 years after the article has been placed in the test system.

The articles described herein can provide release of the oil field chemical into the oil well fluids in a hydrocarbon reservoir such that measureable concentrations of the oil field chemical can be obtained for at least 6 months, preferably at least 9 months, more preferably at least 1 year, even more preferably at least 15 months, particularly at least 18 months, more particularly at least 21 months, even more particularly at least 2 years, especially at least 27 months, more especially at least 30 months, even more especially at least 33 months after the article has been placed in a hydrocarbon reservoir. Some of the articles can provide release of the oil field chemical into the oil well fluids in a hydrocarbon reservoir such that measureable concentrations of the oil field chemical can be obtained for at least 3 years, preferably at least 5 years, more preferably at least 10, most preferably at least 20 years after the article has been placed in a hydrocarbon reservoir.

The composition can release at one of the following percentages of the applied dose of tracer present in the microcapsule over a period of 45 days at 60° C. in a fluid representing an oil field fluid: <45%, preferably <40%, more preferably <30%, even more preferably <25%, particularly <20%, more particularly <15%, even more particularly <10%, especially <5%, more especially <1% and even more especially <0.5%.

Use of Articles Providing a Sustained Release in Well Reservoirs

The compositions described herein have numerous applications in the area of detecting and tracing the movement of oil field fluids in a hydrocarbon reservoir. The compositions and articles described herein can be used in monitoring/tracing a flow of fluid from a hydrocarbon reservoir. The compositions comprising encapsulated tracer particles and one or more bulk polymers in the form of articles of strips, bars, nets, etc. can be placed or delivered downhole to near well bore positions relative to well casings. Ingress and in-flow of gas, oil, water or mixtures of oil and water can be detected and monitored.

A method of tracing fluid flow from a hydrocarbon reservoir can comprise the steps of placing within a well penetrating the reservoir a composition of the first aspect of the invention, where the oil field chemical is a tracer, collecting one or more sample of fluids flowing from the well and analysing said sample to determine at least one of the presence or absence of the tracer and the concentration of one or more tracers in fluids flowing from the well. The method can further comprise one or more of the following steps: collecting a plurality of samples of fluids flowing from the well over time, analyzing the samples and determining the presence or absence of the tracer in the sample, and analyzing the samples and determining the concentrations of one or more tracers in the reservoir fluids over time. The composition can be placed at, around or within a fracture in a rock formation forming said reservoir or at around or within a bore hole, or within, or attached to, a well completion apparatus installed within the well. The step of placing the composition within a well penetrating the reservoir can comprise in-situ polymerization.

Methods used to monitor/trace a flow of fluid from a hydrocarbon reservoir comprise the following steps: (a) placing shaped composition comprising a mixture of a bulk polymer and microcapsules comprising a tracer compound and a polymeric microencapsulant or a tracer contained in a three-dimensional polymeric matrix, on, or in, pipes or fittings to be inserted into a well, to locations on a well, such as filters, casing near or part of the well bores, or within, or attached to, other well completion apparatus installed within the well, (b) thereafter collecting a sample of fluid flowing from the well and analysing the sample to determine the presence or absence of the at least one tracer and optionally determining the concentration of one or more tracers in fluids flowing from the well, (c) collecting and analysing a plurality of samples of fluids flowing from the well over a period of time and determining the concentrations of one or more tracers in the reservoir fluids, and (d) analysing the concentrations of the tracer to determine a pattern of back flow to obtain further reservoir flow information.

Another method of monitoring/tracing a flow of fluid from a hydrocarbon reservoir comprises the following steps:

(a) forming a shaped composition from microcapsules comprising one or more tracers, an embedding polymer or prepolymers with catalysts and additives, on, or in, pipes or fittings to be inserted into a well, at one or more locations of a well, such as filters, casing near or part of the well bores, or within, or attached to, other well completion apparatus installed within the well, and (b) collecting a sample of fluid flowing from the well and analysing the sample to determine the presence or absence of the at least one tracer and optionally determining the concentration of one or more tracers in fluids flowing from the well, or (c) collecting and analysing a plurality of samples of fluids flowing from the well over a period of time and determining the concentrations of one or more tracers in the reservoir fluids, and analysing the concentrations of the tracer to determine a pattern of back flow to obtain further reservoir flow information.

Compositions containing microcapsules of tracer can be used to place tracer into well pipes using in-situ polymerisation. In-situ polymerisation can be used to place tracer within pipes in a hydrocarbon reservoir when the pipes are already partially installed. A composition comprising microcapsules of tracer can be mixed with a component in a two-part polymer system, such as a two-part epoxy resin. Epoxy coatings are generally packaged in two parts that are mixed prior to application. The two parts consist of 1) an epoxy resin which is to be cross-linked with 2) a co-reactant or hardener. A composition comprising microcapsules of tracer can be mixed with the epoxy resin component which then becomes mixed with a co-reactant or hardener when the two-part system is applied to holes within pipe screens located within pipes in the reservoir. In some two part systems, the resin and the hardener are applied as separate materials and then mixed. In other systems, the two components are provided in separate tubes and are mixed together in a single nozzle when applied.

A further method of monitoring/tracing a flow of fluid from a hydrocarbon reservoir comprises the following steps:

(a) placing the shaped composition comprising a mixture of microcapsules comprising one or more tracers, an embedding polymer or prepolymers and catalysts and additives, during the drilling or completion stages, to locations of a reservoir formations, and (b) collecting a sample of fluid flowing from the well and analysing the sample to determine the presence or absence of the at least one tracer and optionally determining the concentration of one or more tracers in fluids flowing from the well, or (c) collecting and analysing a plurality of samples of fluids flowing from the well over a period of time and determining the concentrations of one or more tracers in the reservoir fluids, and analysing the concentrations of the tracer to determine a pattern of back flow to obtain further reservoir flow information.

In a manner similar to handling tracers, other types of oil field chemicals, such as well treatment agents, can be placed or delivered to near well bore positions of well casing and/or reservoir formations to provide well treatment or intervention. A method of treating a hydrocarbon reservoir penetrated by a well can comprise the step of placing within a well penetrating the reservoir a composition comprising: (a) microcapsules comprising an oil field chemical contained within the microcapsules, where each microcapsule has an outer surface, and (b) a bulk polymer, where the microcapsules are embedded within the bulk polymer, and the oil field chemical is a well treatment agent. The method can further comprise one or more of the following steps: collecting samples of fluids flowing from the well over time, analyzing the samples and determining the presence or absence of the targeted chemical compound in the sample, and analyzing the samples and determining the efficiency of the treatment over time. The composition can be placed at, around or within a fracture in a rock formation forming the reservoir or at around or within a bore hole, or within, or attached to, a well completion apparatus installed within the well. The step of placing the composition within a well penetrating the reservoir can comprise in-situ polymerization.

An encapsulated biocide can be formulated with one or more bulk polymers and shaped into articles. The articles in the form of strips, bars, nets etc. can be placed in or near well bore positions relative to well casings. In another aspect, the articles in the forms of bars, blocks and balls are formulated within a stimulation fluid and can be delivered downhole to reservoir formations.

The reservoir formation being treated and analysed in the above methods can be fractured. The compositions described herein can also be delivered to the fractured formations within a liquid. Thus the compositions described herein can be formulated into a fluid (such as a stimulation fluid or a flooding fluid for primary and secondary oil recovery). The compositions described herein can also be mixed with proppants or incorporated into proppants. The microcapsules can be added into the interior of a proppant and the proppant can then be coated with a polymer that acts as a shell around the core. In all these cases, the release of the tracer from the compositions is used to trace fluid movements associated with various operations associated with fracking and stimulation, and the release of well treatment agents, such as corrosion inhibitors and biocides, is used to provide protection to downhole pipeline and equipment and assurance of flow within the pipelines.

Compositions comprising microcapsules comprising oil field chemicals (i.e. tracers or well treatment agents) can be used to place well treatment agents in reservoirs and/or well pipes and provide for the sustained release of well treatment agents of periods of time from over a period at least 6 months, preferably at least 9 months, more preferably at least 1 year, even more preferably at least 15 months, particularly at least 18 months, more particularly at least 21 months, even more particularly at least 2 years, especially at least 27 months, more especially at least 30 months or even more especially at least 33 months after the article has been placed in the test system. Some systems can release for at least 2 years, preferably at least 5 years, more preferably at least 10 years, even more preferably at least 15 years, most preferably for more than 20 years, after the article has been placed in the test system.

The compositions and articles described above can comprise a single oil field chemical where the compositions and articles provide for at least two different release profiles of the oil field chemical. For example, a composition or an article can comprise a microcapsule particle embedded in a bulk polymer, where a single oil field chemical is encapsulated within the core of the microencapsulated particle and is also placed within the outer shell. The oil field chemical in the outer shell provides for a rapid release (days to weeks) of the oil field chemical. The combination of the microcapsules with the bulk polymer provides a slower release (months to a year or more) of the oil field chemical. In a further example, a composition or an article comprises a microcapsule particle embedded in a bulk polymer, where a single oil field chemical is present within the bulk polymer and is also encapsulated within the core of the microencapsulated particle. The combination of the microcapsule with the bulk polymer provides a slower release (months to a year or more) of the oil field chemical, while the bulk polymer provides for release at a different (e.g. more rapid, days to weeks) rate for the oil field chemical.

The compositions and articles described above can comprise two or more oil field chemicals where the compositions and articles provide for at least two different release profiles. For example, a composition or an article can comprise a microcapsule embedded in a bulk polymer, where a first oil field chemical is present within the outer shell and a second oil field chemical is encapsulated within the core of the microcapsule. The microcapsule in combination with the bulk polymer provides a slower release (months to a year or more) for the second oil field chemical, while the outer shell in combination with the bulk polymer provides for release at a different (e.g. more rapid, days to weeks) rate for the first oil field chemical. In a further example, a composition or an article can comprise a microcapsule embedded in a bulk polymer, where a first oil field chemical is present within the bulk polymer and a second oil field chemical is encapsulated within the core of the microcapsule. The microcapsule in the combination with the bulk polymer provides a slower release (months to a year or more) for the second oil field chemical, while the bulk polymer provides for release at a different (e.g. more rapid, days to weeks) rate for the first oil field chemical.

The delivery of tracers in the compositions of the invention provide for the sustained release of the tracer that allows fluid flow within and from a hydrocarbon reservoir and well to be monitored and traced. A method of providing controlled slow release of an oil field chemical to a well or hydrocarbon reservoir comprises placing a composition of the first aspect of the invention within an oil well or reservoir, where the oil field chemical is a well treatment agent.

In one aspect of the invention, compositions and articles comprising a plurality of tracers are placed at different locations along the length of a well penetrating a reservoir, during completion of the well before production begins. The article or composition at each location can be attached to a section of pipe before it is placed at that location or delivered into the location on perforated casing. When production begins, detection and quantification of the individual tracers in the oil or gas produced by the well provides ways to monitor and quantify the oil or gas being produced from different zones of the reservoir.

In another aspect of the present invention, more than one tracer can be used to measure multiple operations in the same well. For example, oil wells often have more than one producing strata or zone. A stratum could be fractured using a first tracer and a different stratum could be fractured using a second tracer. Horizontal drilling allows for the drilling of multiple bores terminating in a common bore which connects to the surface. In multilateral wells such as these, several different tracers could be used to keep track of concurrent recovery of materials from the several legs (lateral bores) of such wells. These methods can be used to monitor and track the flow of fluid from such wells.

EXAMPLES

Example 1.—Preparation of Microcapsules Containing a Tracer and Elution of Pure Tracer and the Tracer from Microcapsules A tracer (Tracer A: a solid haloaromatic compound, density 2.3 g/cm$^3$ at 25° C. and 1 atm) was ground and filtered through a 100 µm sieve. 1.2 g carboxylmethylcellulose sodium salt (Sigma) was dissolved in 78.3 g water and then mixed with 15.9 g Beetle resin (BIP) and 0.35 g formic acid (96%, Sigma) to form an aqueous mixture. The aqueous mixture was stirred at 25° C. for 1 hour. 60 g of the sieved tracer and the aqueous mixture were then homogenised together for 5 minutes using a Silverson L4R laboratory homogeniser. During the homogenisation process, 300 g water was added to dilute the mixture. The homogenised mixture was stirred at 25° C. for 2 hours and then at 65° C. for 2 more hours. The resultant dispersion was filtered, dried in air for 3 days and then dried in a vacuum oven at 50° C. for 8 hours. The dried powder product containing the encapsulated tracer was filtered through a 425 µm sieve. Total tracer content in the final powder product was 84%. The powders were dispersed in deionised water and tested using a Malvern Mastersizer 2000 under 85% ultrasonication for particle size. The measured volume weighted mean particle size was 23 µm.

Samples of the pure (not microencapsulated) tracer (0.135 g) and the microencapsulated tracer (0.16 g, weight equivalent to 0.135 g tracer) were placed into separate samples of 18 g of a synthetic oil (80% Transulate transformer oil (a blend of highly refined mineral oils with multifunctional additives) (Smith & Allan) and 20% Downtherm Q oil (a mixture of diphenylethane and alkylated aromatics) (Dow Chemical), a model oil representative of fluid from an hydrocarbon reservoir, at 60° C. and stirred. Samples of the synthetic oil were taken at various times and analysed to determine the % of the applied amount of tracer released into the synthetic oil. FIG. 2 shows that the pure tracer completely dissolved in the synthetic oil in just two minutes. The release of the tracer from the microcapsules was much slower, with about 50% of the tracer released at about four to five hours and about 70% of the tracer released at about 6 hours. The release of the tracer from the microcapsules appears to be linear over the six hours of analysis during which about 70% of the tracer was released.

Example 2—Preparation of Sustained Release Articles with Microencapsulated Oil Tracer A mixture of 10 g microencapsulated oil tracer particles obtained from Example 1, 9 g bisphenol A diglycidyl ether (Sigma) and 1 g triethylenetetramine (technical grade, Sigma) were combined in a plastic container and mixed with a stainless steel spatula. The mixture was transferred to a 25 mL plastic syringe and injected into silicon moulds. The moulds were in a cylindrical shape with a radius of 0.9 cm and a height of 1.1 cm. The moulded composition was cured in an oven at 60° C. for 2 hours. The articles in the shape of a cylinder were easily removed from the moulds. The articles contained 41% by weight of tracer A. The cylinder appeared to be uniform throughout and showed only a very faint colour.

Example 3—Elution Test of an Oil Tracer from Sustained Release Articles into Toluene Toluene was used as a model oil for characterising the elution of tracer from articles in the shape of cylinders. A cylinder made from Example 2 (mass: 3.4705 g) was suspended in a glass bottle containing 150 mL of toluene. Toluene and the cylinder were stirred at a temperature of 60° C. and samples (~0.5 mL) of toluene were taken from the bottle at various times. The samples were diluted, if necessary, and analysed using GC-MS or GC-ECD. In order to maintain the total amount of toluene in the test bottle, ~0.5 mL of fresh toluene was injected into the test bottle each time after a sample was taken.

The entire amount of toluene inside the test bottle was also replaced with fresh toluene at various times. The cumulative concentration of tracer released was calculated by adding the concentration of the tracer in the toluene in the bottle that is mixed with the article to the final concentrations of tracer in toluene that had been replaced. Based on the cumulative concentration of tracer in toluene, the total amount of tracer released was calculated.

The cylinders showed excellent integrity. The morphology of the cylinder remained unchanged after 4500 hours in toluene at 60° C.

Figure 3:
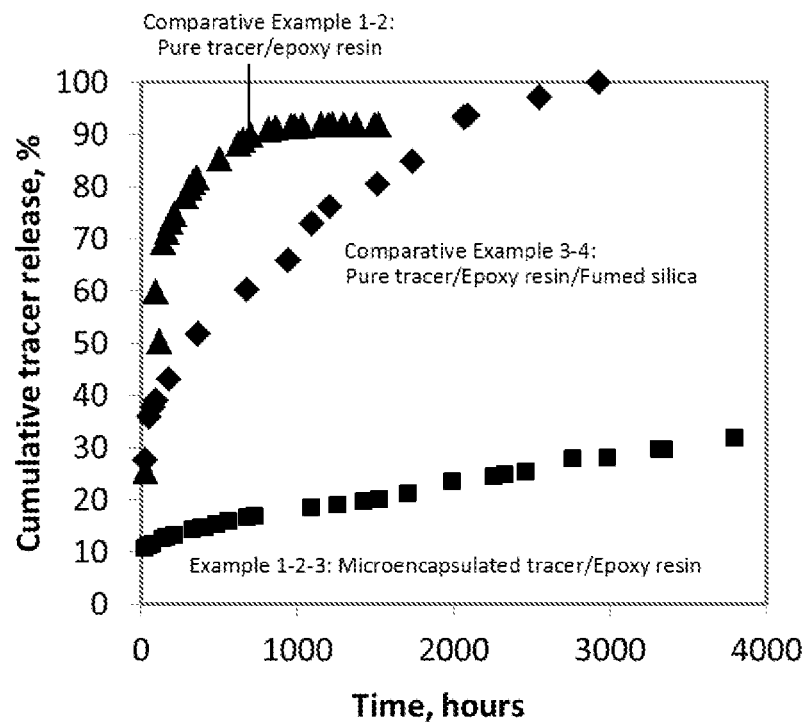
FIG. 3 is a graphical representation of the release rate of an aromatic tracer into toluene from (a) microcapsules incorporated into epoxy resin as described in Examples 1-2-3, (b) pure tracer incorporated into epoxy resin as described in Comparative Examples 1-2 and (c) pure tracer along with fumed silica incorporated into epoxy resin as described in Comparative Examples 3-4.

The elution profile of tracer from the cylinder containing microencapsulated tracer from Example 2 is shown in FIG. 3. The composition provides for a sustained release with a linear release of the tracer after an initial release phase. The release rate was 1.94 mg tracer every 24 hours for a period of about 6 months. Only about 30% of the applied tracer had been released by about 5-6 months.

Example 4—Preparation of Microcapsules Containing a Second Oil Tracer

A second oil tracer (Solid tracer B: a haloaromatic compound, density 1.2 g/cm$^3$ at 25° C. and 1 atm) was sieved through a 100 μm sieve. 7.7 g carboxylmethylcellulose sodium salt (Sigma) was dissolved in 900 g water and then mixed with 101.8 g Beetle resin (BIP) and 2.24 g formic acid (96%, Sigma) to form an aqueous mixture. The aqueous mixture was stirred at 25° C. for 1 hour.

640 g of the sieved tracer and the aqueous mixture were then homogenised together for 15 minutes using a Silverson L4R laboratory homogeniser. During the homogenisation, 300 g water was added to dilute the mixture. The homogenised mixture was stirred at 25° C. for 2 hours and then at 65° C. for 2 more hours. The resultant dispersion was filtered, dried in the air for 3 days and then dried in a vacuum oven at 50° C. for 8 hours. The dried powder product was filtered through a 425 μm sieve. Total tracer content in the final powder product was 85%.

Example 5—Preparation of Slow Release Pieces Formed by Compounding and Injection Moulding with a Microencapsulated Second Oil Tracer 600 g of microencapsulated tracer particles from Example 4 were compounded with 1.8 kg of polybutylene terephthalate (Arnite T08 200 DSM) and extruded through a twin screw extruder (Prism TS24E ThermoFisher) at 240° C. The extrudate was cooled with water and then pelletized. The pellets were then dried at 110° C. for 3 hours. The dried pellets were then injection moulded into articles having dimensions of 125 mm long, 12.5 mm wide and 3.2 mm thick using an injection moulding machine (Boy 22S BOYS Machines.) at 240° C.

Example 6—Elution Test of Sustained Release Articles Containing a Second Oil Tracer in a Synthetic Oil A synthetic oil composed of 80% Transulate transformer oil (Smith & Allan) and 20% Downtherm Q oil (Dow) was used as a model oil to test the elution performance of the injection moulded articles made from Example 5. A sample (0.7107 g) from the injection moulded article was suspended in a glass bottle containing 200 mL of the above mentioned synthetic oil. The solution of synthetic oil and the cylinder was stirred at a temperature of 60° C. The procedures for taking samples and changing oils were similar to that described in Example 3.

Figure 4:
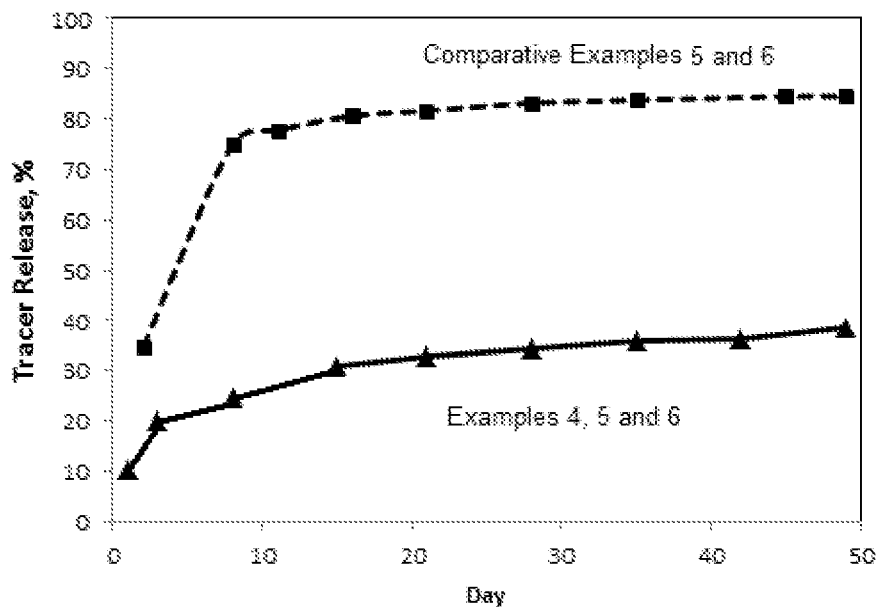
FIG. 4 is a graphical representation of the release rate of an aromatic ketone tracer into synthetic oil from (a) microcapsules incorporated into a bulk polymer (polybutylene terephthalate (PBT)) as described in Examples 4-5-6, (b) pure tracer incorporated into PBT as described Comparative Examples 5-6.

The elution profile of the microencapsulated tracer based test pieces from Example 6 is shown in FIG. 4. The release of the tracer from the injection moulded articles comprising the microencapsulated tracer was sustained compared to the release of tracer that was not microencapsulated as shown in Comparative Examples 5 and 6 described below. The compositions containing microencapsulated tracer released about 40% of the initial amount of tracer present over 49 days, while Comparative Examples 5 and 6 released about 35% of the initial amount of tracer with 2 days and between about 75% and 85% from about 9 days through 49 days. The release of tracer from the article containing the microcapsules had an initial release of about 20% of the applied dose over the first four days, followed by an approximately linear release of about 20% of the applied dose over the next 45 days.

Example 7—Microencapsulation of Third Oil Tracer

A third oil tracer (Tracer C: a solid halogenated benzene tracer, density 3.0 g/cm$^3$ at 25° C. and 1 atm) was ground and sieved through a 100 μm sieve. 640 g of the sieved oil tracer was microencapsulated following the procedure outlined in Example 4. The powders were dispersed in deionised water and tested using a Malvern Mastersizer 2000 under 85% ultrasonication for particle size. The measured volume weighted mean particle size was 10.5 μm. The total tracer content in the final powder product was 88%.

Example 8—Preparation of Sustained Release Articles by Compounding and Injection Moulding with the Third Microencapsulated Oil Tracer 600 g of microencapsulated tracer particles from Example 7 were compounded with 1.68 Kg isotactic polypropylene (Moplen HP556E, LyndellBassell Industries) and 0.12 Kg ethylene-methacrylate copolymer (Lotryl 20 MA08, Arkema) and extruded through a twin screw extruder (Prism TS24E, ThermoFisher) at 240° C. The extrudate was cooled with water and then pelletised. The pellets were dried at 110° C. for 3 hours, then injection moulded into articles having dimensions of 125 mm long, 12.5 mm wide and 3.2 mm thick using an injection moulding machine (Boy 22S, BOYS Machines) at 240° C.

Example 9—Elution Test of Articles Comprising an Aromatic Tracer in Synthetic Oil A sample (0.5666 g) of the article from Example 8 was tested in the synthetic oil described in Example 6 following the procedure of Example 6.

Figure 5:
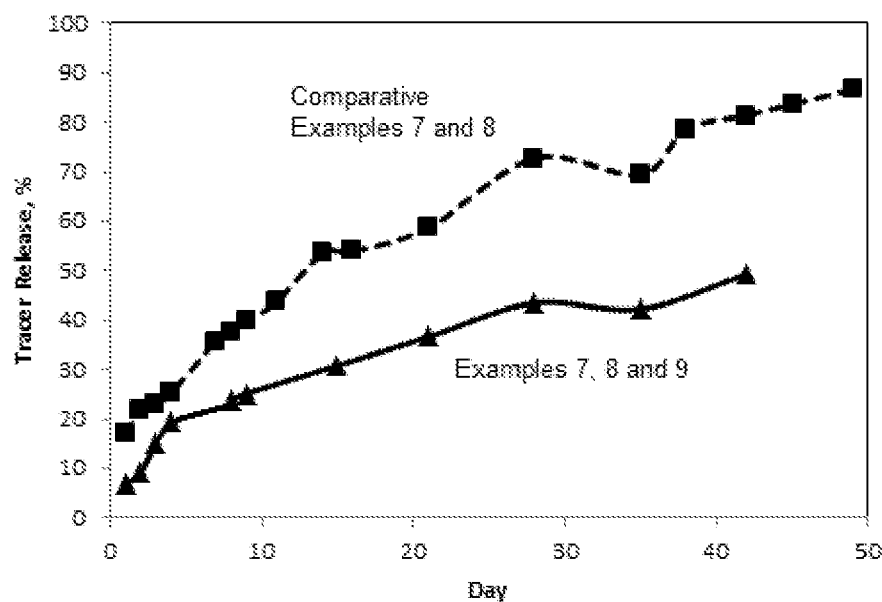
FIG. 5 is a graphical representation of the release rate of an aromatic tracer into synthetic oil from (a) microcapsules incorporated into a bulk polymer (Polypropylene (PP)) and from a mixture of the tracer in the bulk polymer as described in Example 7-8-9, (b) pure tracer incorporated into PP as described in Comparative Examples 7-8.

The elution profile of tracer from the article from Example 8 is shown in FIG. 5. The release of tracer from the article containing microencapsulated tracer in Example 8 was slower than the release of tracer from articles where the tracer was not microencapsulated, as shown in Comparative examples 7 and 8, described in the following sections. The release of tracer from the article containing microencapsulated tracer had an initial release of about 20% of the applied tracer, followed by a slower, approximately linear release of less than about 30% of the applied tracer over the next approximately 40 days. The release rate over the linear release phase was less than about 0.75% per day over the about 40 days (<30%/40 days).

Example 10—Elution Test of Sustained Release Cylinder in a Synthetic Oil

Figure 6:
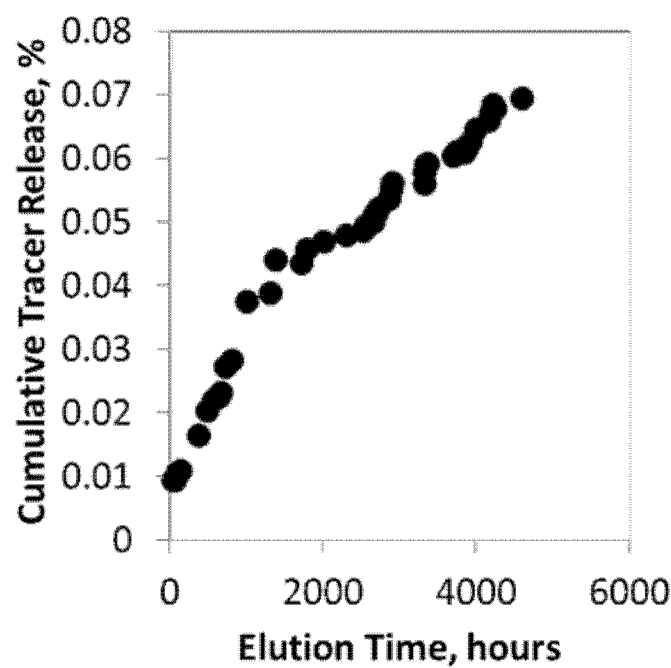
FIG. 6 is a graphical representation of the release rate of an aromatic tracer into synthetic oil from microcapsules incorporated into a bulk polymer (epoxy resin) as described in Example 10.

A cylinder made in Example 2 containing a microencapsulated haloaromatic tracer was tested in synthetic oil following the procedure of Example 6. The elution profile is shown in FIG. 6. The release of tracer from the article was much slower than that observed even from other articles containing microencapsulated tracer as shown by the release of less than 0.08% of the initial amount of tracer over a period of about 5000 hours (about 200 days). Extrapolation of this data indicates that under the conditions of this test, a sustained, measureable release of tracer can be expected to last at least about 5 years, preferably at least about 10 years, more preferably at least about 15 years, and most preferably at least about 20 years.

Example 11—Microencapsulation of a Liquid Tracer

An oil tracer (Tracer D: A liquid benzene tracer substituted with mixed halogens, density 2.0 g/cm$^3$ at 25° C. and 1 atm) was encapsulated as described below. 1.52 g carboxylmethylcellulose sodium salt (Sigma) was dissolved in 81.8 g water and then mixed with 18.63 g Beetle resin (BIP) and 0.36 g formic acid (96%, Sigma) to form an aqueous mixture. The aqueous mixture was stirred at 25° C. for 1 hour. 0.57 g Narad Solvent Red 175 dye was dissolved in 60 g of the liquid tracer. The liquid tracer/dye mixture and the aqueous mixture were then homogenised together for 5 minutes using a Silverson L4R laboratory homogeniser. During the homogenisation process, 120 g water was added to dilute the mixture. The homogenised mixture was stirred at 25° C. for 2 hours and then at 65° C. for 2 more hours. The resultant dispersion was filtered, dried in the air for 3 days and then dried in a vacuum oven at 40° C. for 10 hours. The dried powder product containing the encapsulated tracer was filtered through a 425 μm sieve.

Example 12—Preparation of Slow Release Articles with Microencapsulated Liquid Oil Tracer A mixture of 10 g solid powder of microencapsulated liquid oil tracer from Example 11, 9 g bisphenol A diglycidyl ether (Sigma) and 1 g triethylenetetramine (technical grade, Sigma) were combined in a plastic container and mixed with a stainless spatula. The mixture was transferred to a 25 mL plastic syringe and injected into silicon moulds. The moulds were in a cylindrical shape with a radius of 0.9 cm and a height of 1.1 cm. The moulded composition was cured in an oven at 60° C. for 2 hours. The articles in the shape of a cylinder were easily peeled off from the moulds. The articles contained 41% by weight of liquid tracer D. The cylinder appeared to be uniform throughout and had a very slightly purplish red colour coming from dyes dosed in the liquid tracer.

Example 13—Microencapsulation of a Biocide

A biocide (Biocide A: an anthraquinone compound, density ~1.3 g/cm3 at 25° C. and 1 atm) was encapsulated as described below. 1.2 g carboxylmethylcellulose sodium salt (Sigma) was dissolved in 78.3 g water and then mixed with 15.9 g Beetle resin (BIP) and 0.35 g formic acid (96%, Sigma) to form an aqueous mixture. The aqueous mixture was stirred at 25° C. for 1 hour. 60 g of the biocide and the aqueous mixture were then homogenised together for 5 minutes using a Silverson L4R laboratory homogeniser. During the homogenisation process, 300 g water was added to dilute the mixture. The homogenised mixture was stirred at 25° C. for 2 hours and then at 65° C. for 2 more hours. The resultant dispersion was filtered, dried in the air for 3 days and then dried in a vacuum oven at 50° C. for 8 hours. Total biocide content in the final powder product was 85%. The dried powder product containing the encapsulated biocide was filtered through a 425 μm sieve.

Example 14—Preparation of an Article with a Microencapsulated Biocide

A mixture of 10 g microencapsulated biocide particles obtained from Example 13, 9 g bisphenol A diglycidyl ether (Sigma) and 1 g triethylenetetramine (technical grade, Sigma) were combined in a plastic container and mixed with a stainless steel spatula. The mixture was transferred to a 25 mL plastic syringe and injected into silicon moulds. The moulds were in a cylindrical shape with a radius of 0.9 cm and a height of 1.1 cm. The moulded composition was cured in an oven at 60° C. for 2 hours. The articles in the shape of a cylinder were easily removed from the moulds. The cylinder contained 41% by weight of biocide A. The cylinder appeared to be uniform throughout and had a very slightly yellow colour.

Example 15—Preparation of an Article with Microencapsulated Tracer B

A mixture of 10 g microencapsulated tracer B particles obtained from Example 4, 9 g bisphenol A diglycidyl ether (Sigma) and 1 g triethylenetetramine (technical grade, Sigma) were combined in a plastic container and mixed with a stainless steel spatula. The mixture was transferred to a 25 mL plastic syringe and injected into silicon moulds. The moulds were in a cylindrical shape with a radius of 0.9 cm and a height of 1.1 cm. The moulded composition was cured in an oven at 60° C. for 2 hours. The articles in the shape of a cylinder were easily removed from the moulds. The cylinder contained 41% by weight of tracer B. The cylinder appeared to be uniform throughout and had only a very slightly off-white colour.

Example 16—Preparation of an Article with Microencapsulated Tracer C

A mixture of 10 g microencapsulated tracer C particles obtained from Example 7, 9 g bisphenol A diglycidyl ether (Sigma) and 1 g triethylenetetramine (technical grade, Sigma) were combined in a plastic container and mixed with a stainless steel spatula. The mixture was transferred to a 25 mL plastic syringe and injected into silicon moulds. The moulds were in a cylindrical shape with a radius of 0.9 cm and a height of 1.1 cm. The moulded composition was cured in an oven at 60° C. for 2 hours. The articles in the shape of a cylinder were easily removed from the moulds. The cylinder contained 41% by weight of tracer C. The cylinder appeared to be uniform throughout and had a slightly cream white colour.

Comparative Example 1—Preparation of an Article Comprising an Aromatic Tracer that is not Microencapsulated Solid aromatic tracer A was ground and sieved through a 100 μm sieve. 8.2 g of the sieved tracer, 10.51 g bisphenol A diglycidyl ether (Sigma) and 1.17 g triethylenetetramine (technical grade, Sigma) were mixed together, moulded into the form of a cylinder and cured following the procedure as described in Example 2. The cylinder contained 40% by weight of tracer A. The cylinder obtained was not uniform in appearance along the depth of the cylinder. Accumulation of the tracer at the bottom of the cylinder was noticed. The top of the cylinder was transparent while the bottom was opaque, due to settling of the tracer in the polymer. The cylinder became more opaque towards the bottom. The entire cylinder had a strong yellow colour.

Comparative Example 2—Elution Test of an Aromatic Tracer that is not Microencapsulated from an Article into Toluene An article in the form of a cylinder made from Comparative Example 1 (mass: 3.2721 g) was tested to determine its elution properties into toluene using the same setup and following the procedure as outlined in Example 3. The cylinder showed very poor integrity. Big cracks appeared throughout the cylinder within 120 hours of being left in toluene at 60° C.

The elution profile of tracer that was not microencapsulated from the cylinder of Comparative Example 1 is shown in FIG. 3. The release of the tracer is rapid and not sustained. About 70% of the tracer was released in the first 7 days (~150 mg every 24 hours) and another 22% released in ~4 weeks of time gradually (in average 10 mg every 24 hours). After these two elution periods, the release slowed and nearly stopped.

Comparative Example 3—Preparation of a Tracer that is not Microencapsulated from an Article Comprising Fumed Silica Solid aromatic tracer A was ground and sieved through a 100 µm sieve. 8.2 g of the sieved tracer particles, 10.09 g bisphenol A diglycidyl ether (Sigma), 1.12 g triethylenetetramine (technical grade, Sigma) and 0.47 g fumed silica (Sigma) were mixed together, moulded and cured following the procedure described in Example 2. The cylinder contained 40% by weight of tracer A. The cylinder obtained was more uniform than the cylinder of Comparative Example 1, but was still not uniform along the depth of the cylinder. A slight accumulation of tracer on the bottom of the cylinder was observed. The top of the cylinder was slightly transparent while the bottom was opaque with light yellow colour, due to settling of tracers in the polymer. The cylinder became gradually more opaque from the top to the bottom. The cylinder had a slight yellow colour.

Comparative Example 4—Elution Test of an Aromatic Tracer that is not Microencapsulated from an Article Comprising Fumed Silica into Toluene An article in the form of a cylinder made from the material in Comparative Example 3 (mass: 3.3396 g) was tested for elution properties into toluene using the same setup and following the procedure as outlined in Example 3. The cylinder showed poor integrity. Big cracks appeared throughout the cylinder within 330 hours of being place in toluene at 60° C.

The elution profile of the tracer that is not microencapsulated from the cylinder of Comparative Example 3 is shown in FIG. 3. Compared to the simple mixture of tracer that is not microencapsulated and epoxy resin in Comparative Example 1, the release of tracer from the sample in toluene from Comparative Example 3 was improved, but was still fairly rapid, with about 35% of the tracer having been released in the first 2 days (~230 mg every 24 hours) and the remaining tracer being released in just over a 3 month period (average ~9.5 mg every 24 hours).

Comparative Example 5—Preparation of an Article Comprising an Aromatic Ketone Tracer that is not Microencapsulated Solid aromatic ketone tracer B was ground and sieved through a 100 µm sieve. 0.4 Kg tracer (not microencapsulated), 1.52 Kg polybutylene terephthalate (Arnite T08 200 DSM) and 80 g ethylene-methacrylate copolymer (Lotryl 20 MA08, Arkema) were compounded and injection moulded following the procedure as outlined in Example 5.

Comparative Example 6—Elution Test of an Aromatic Ketone Tracer that is not Microencapsulated from an Article into a Synthetic Oil An article made from Comparative Example 5 (mass: 0.7366 g) was tested in the synthetic oil as described in Example 6 and following the procedure as outlined in Example 6.

The elution profile of tracer that is not microencapsulated from the cylinder from Comparative Example 5 is shown in FIG. 4. Tracer that was not microencapsulated was released from the article much faster than microencapsulated tracer prior to incorporation in polybutylene terephthalate as described in Example 4-5-6. About 75% of the tracer was released over the first 8 days and about 10% of the tracer was released from about 8 to 49 days.

Comparative Example 7—Preparation of an Article Comprising an Aromatic Tracer that is not Microencapsulated Solid aromatic tracer C was ground and sieved through a 100 µm sieve. 0.4 Kg of the tracer (not microencapsulated), 1.52 Kg isotactic polypropylene (Moplen HP556E Lyndell-Bassell Industries) and 80 g ethylene-methacrylate copolymer (Lotryl 20 MA08, Arkema) were compounded and injection moulded following the procedure as outlined in Example 5.

Comparative Example 8—Elution Test of a Tracer that is not Microencapsulated from an Article into a Synthetic Oil An article made from Comparative Example 7 (mass: 0.8348 g) was tested in synthetic oil using the procedure described in Example 6.

The elution profile of tracer that was not microencapsulated from the cylinder of Comparative Example 7 is shown in FIG. 5. The tracer that was not microencapsulated was released from the article much faster than a comparable article in which the tracer was microencapsulated prior to incorporation in polypropylene as described in Examples 7-8-9. By 12 days, about 50% of the total amount of tracer was released from the article of Comparative Example 7, where the tracer was not microencapsulated, while this amount of tracer was not released from the comparable article having microencapsulated tracer until about 42 days. The release of tracer that was not microencapsulated from the article of Comparative Example 7 had an initial release of about 20% of the applied dose over the first day, followed by a linear release from days 1 to 14, where the total release of the tracer was from about 20% to about 55% of the total tracer loading, and then a third, slower, approximately linear release where the total release of the tracer was from about 55% to about 85% of the total tracer loading from about 14 to about 49 days.

Comparative Example 9—Preparation of an Article Comprising Tracer B that is not Microencapsulated Solid tracer B was ground and sieved through a 100 µm sieve. 8.2 g of the sieved tracer, 10.51 g bisphenol A diglycidyl ether (Sigma) and 1.17 g triethylenetetramine (technical grade, Sigma) were mixed together, moulded into the form of a cylinder and cured following the procedure as described in Example 2. The cylinder was quite uniform throughout and had a slight off-white colour.

Comparative Example 10—Preparation of an Article Comprising Tracer C that is not Microencapsulated Solid tracer C was ground and sieved through a 100 μm sieve. 8.2 g of the sieved tracer, 10.51 g bisphenol A diglycidyl ether (Sigma) and 1.17 g triethylenetetramine (technical grade, Sigma) were mixed together, moulded into the form of a cylinder and cured following the procedure as described in Example 2. The cylinder contained 40% by weight of tracer C. The cylinder obtained was not uniform along the depth of the cylinder, with accumulation of tracer at the bottom of the cylinder being observed. The top of the cylinder had a very light yellow colour while the bottom of the cylinder had a quite strong yellow colour. The colour became darker as the bottom was approached.

Comparative Example 11—Preparation of an Article Comprising Biocide A that is not Microencapsulated 8.2 g of biocide A that was not microencapsulated, 10.51 g bisphenol A diglycidyl ether (Sigma) and 1.17 g triethylenetetramine (technical grade, Sigma) were mixed together, moulded into the form of a cylinder and cured following the procedure as described in Example 2. The cylinder contained 40% by weight of biocide. The cylinder obtained was not uniform along the depth of the cylinder, with accumulation of biocide at the bottom of the cylinder being observed. The top of the cylinder had a very dark yellow colour and the bottom side had an even darker yellow colour, with the darkness of the colour increasing as the bottom was approached.

Comparative Example 12—Preparation of an Article Comprising Liquid Tracer D that is not Microencapsulated 8.2 g of liquid tracer D that was not microencapsulated, 10.51 g bisphenol A diglycidyl ether (Sigma) and 1.17 g triethylenetetramine (technical grade, Sigma) were mixed together, then poured into the same mould as described in Example 2. The moulded composition was placed in an oven at 60° C. for 2 hours to cure. After 2 hours, a solid cylinder had not been formed.

Example 17—Elution Test of Sustained Release Articles Containing Microencapsulated Aromatic Oil Tracer B in a Synthetic Oil A synthetic oil composed of 80% Transulate transformer oil (Smith & Allan) and 20% Downtherm Q oil (Dow) was used as a model oil to test the elution performance of the sustained release article. A cylinder article (3.7556 g) containing microencapsulated aromatic tracer B made from Example 15 was suspended in a glass bottle containing 200 mL of the above mentioned synthetic oil. The solution of synthetic oil and the cylinder was stirred at a temperature of 90° C. The procedures for taking samples and changing oils were similar to that described in Example 3.

Figure 7:
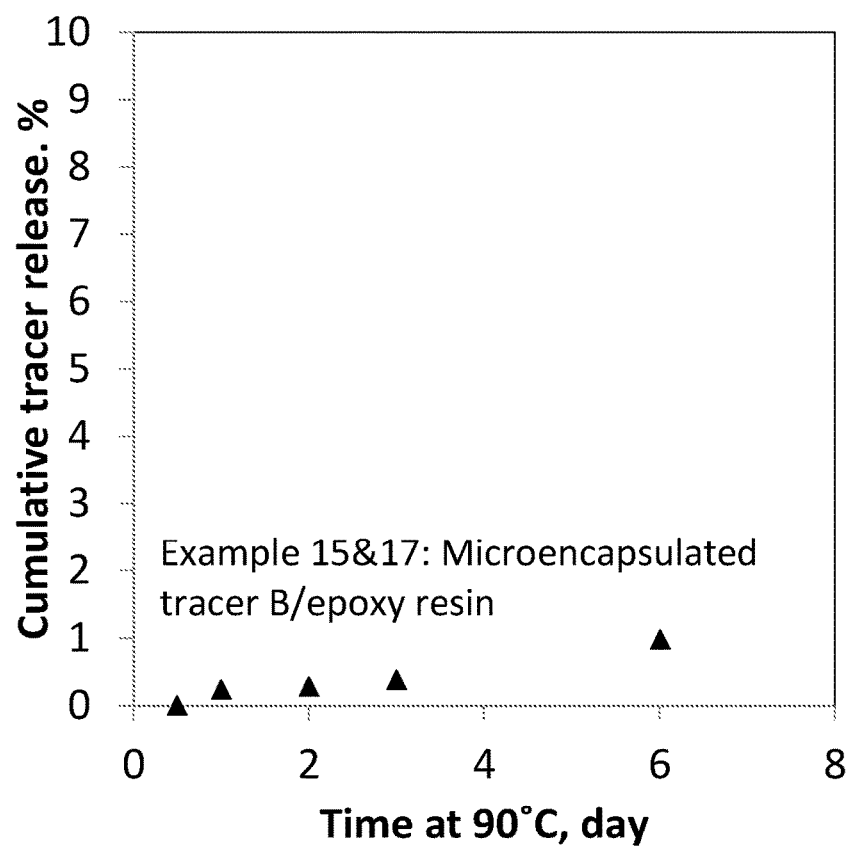
FIG. 7 is a graphical representation of the release rate of an aromatic tracer (tracer B) into synthetic oil at 90° C. from microcapsules in a bulk polymer (epoxy resin) as described in Example 15 and 17.

The elution profile of the microencapsulated tracer based test pieces from Example 15 is shown in FIG. 7. The release of the tracer from the article comprising the microencapsulated tracer B was sustained compared to the release of tracer that was not microencapsulated as shown in Comparative Example 13 described below. The compositions containing microencapsulated tracer released just less than 1% of the initial amount of tracer present over 6 days, while Comparative Example 13 released about 90% of the initial amount of tracer in the same period of time.

Example 18—Extended Elution Test of Aromatic Oil Tracer A from Sustained Release Articles into Toluene Toluene was used as a model oil for characterising the elution of tracer from articles in the shape of cylinders. After over 4000 hours elution test in toluene in Example 3, the same cylinder was subjected to extended elution test continuously in toluene at 60° C., following the procedure described in Example 3.

Figure 8:
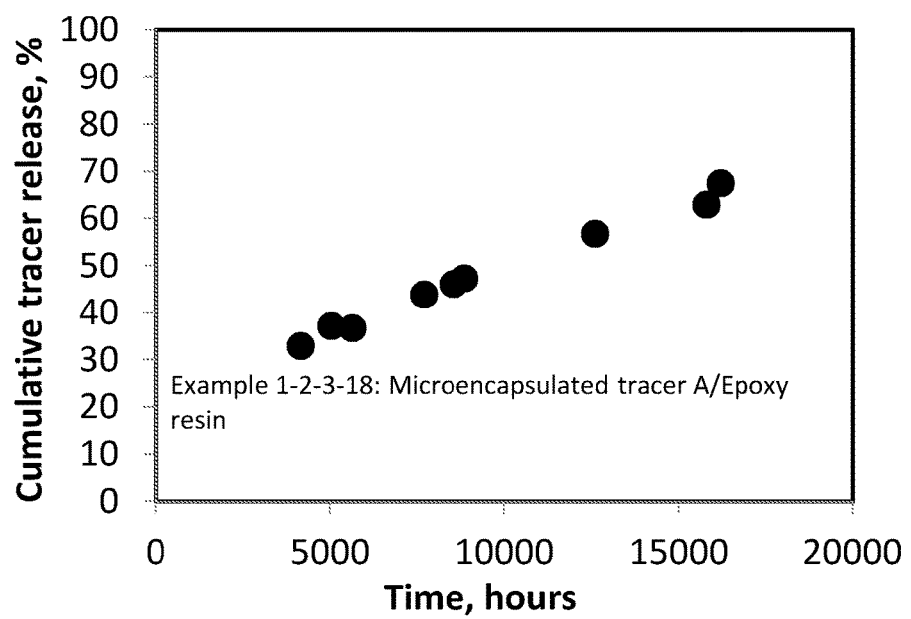
FIG. 8 is a graphical representation of the release rate of an aromatic tracer (tracer A) into toluene at 60° C. from microcapsules in a bulk polymer (epoxy resin) in an extended period between 4000 and 17000 hours as described in Example 1, 2, 3, and 18.

The elution profile of tracer from the extended is shown in FIG. 8. It is clear that the composition prepared in Example 2 continued to provide for a sustained release with an overall linear release of the tracer beyond the initial 4000 hours' period described in Example 3 to 16200 hours (~22 months). About 40% of the applied tracer had been released between 4000 and 16200 hours.

Example 19—Microencapsulation of a Fifth Oil Tracer

A fifth oil tracer (Tracer E: a solid aromatic tracer, density 2.6 g/cm3 at 25° C. and 1 atm) was used without any grinding. 0.48 g carboxylmethylcellulose sodium salt (Sigma) was dissolved in 100 g water and then mixed with 6.36 g Beetle resin (BIP) and 0.14 g formic acid (96%, Sigma) to form an aqueous mixture. The aqueous mixture was stirred at 25° C. for 1 hour.

100 g of the sieved tracer and the aqueous mixture were then homogenised together for 15 minutes using a Silverson L4R laboratory homogeniser. The homogenised mixture was stirred at 25° C. for 2 hours and then at 65° C. for 2 more hours. The resultant dispersion was filtered, dried in the air for 24 hours and then dried in a vacuum oven at 50° C. for 8 hours. The dried powder product was filtered through a 800 μm sieve. Total tracer content in the final powder product was 95.2%.

Example 20—Preparation of Sustained Release Articles with Microencapsulated Oil Tracer E A mixture of 11.0 g microencapsulated oil tracer particles obtained from Example 19, 10.0 g bisphenol A diglycidyl ether (Sigma), and 1.0 g triethylenetetramine (technical grade, Sigma) were combined in a plastic container and mixed with a stainless steel spatula. The mixture was transferred to a 25 mL plastic syringe and injected into silicon moulds. The moulds were in a cube shape with edge length of 1.5 cm. The moulded composition was cured in an oven at 60° C. for 2 hours. The articles in the shape of a cube were easily removed from the moulds. The articles contained 47.6% by weight of tracer E. The cubes appeared to be uniform throughout and showed only an off-white colour.

Example 21—Preparation of Sustained Release Articles with Microencapsulated Oil Tracer E A mixture of 8.5 g microencapsulated oil tracer particles obtained from Example 19 with 5.0 g formulated epoxy resin I, comprised of 4.0 g bisphenol A diglycidyl ether (Sigma) and 1.0 g epoxy compound, and 1.0 g triethylenetetramine (technical grade, Sigma) were combined in a plastic container and mixed with a stainless steel spatula. The mixture was transferred to a 25 mL plastic syringe and injected into silicon moulds. The moulds were in a cube shape with edge length of 1.5 cm. The moulded composition was cured in an oven at 60° C. for 2 hours. The articles in the shape of a cube were easily removed from the moulds. The articles contained 55.8% by weight of tracer E. The cubes appeared to be uniform throughout and showed only an off-white colour.

Example 22—Preparation of Sustained Release Articles with Microencapsulated Oil Tracer E A mixture of 8.5 g microencapsulated oil tracer particles obtained from Example 19 with 5.0 g formulated epoxy resin II, comprised of 3.50 g bisphenol A diglycidyl ether (Sigma) and 1.5 g epoxy compound, and 1.0 g triethylenetetramine (technical grade, Sigma) were combined in a plastic container and mixed with a stainless steel spatula. The mixture was transferred to a 25 mL plastic syringe and injected into silicon moulds. The moulds were in a cube shape with edge length of 1.5 cm. The moulded composition was cured in an oven at 60° C. for 2 hours. The articles in the shape of a cube were easily removed from the moulds. The articles contained 55.8% by weight of tracer E. The cubes appeared to be uniform throughout and showed only an off-white colour.

Example 23—Elution Test of Sustained Release Cube in a Synthetic Oil

Figure 9:
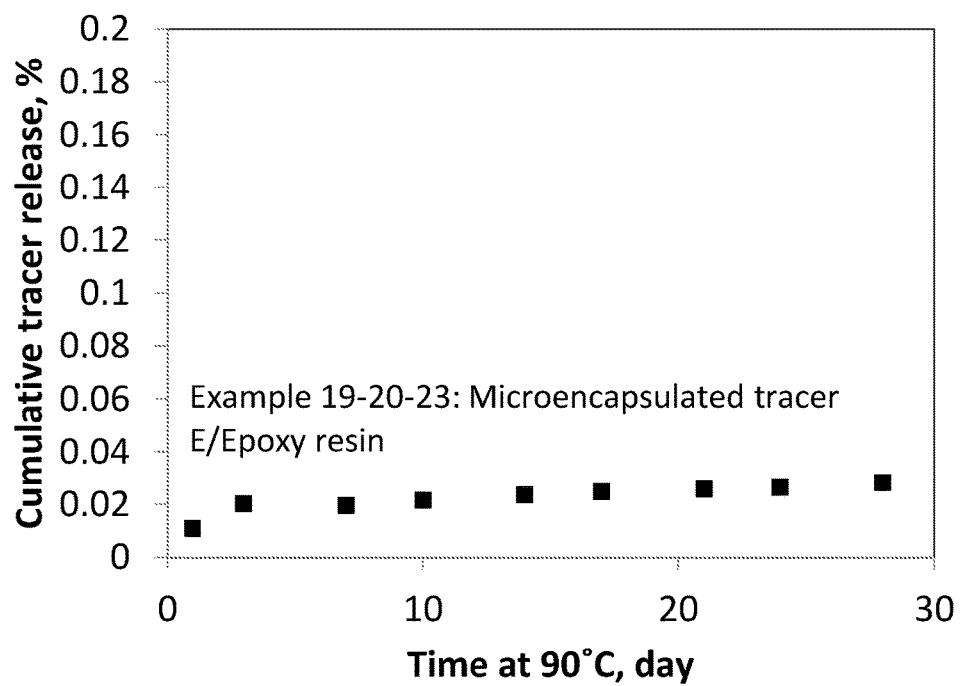
FIG. 9 is a graphical representation of the release rate of an aromatic tracer (tracer E) into synthetic oil at 90° C. from microcapsules in a bulk polymer (epoxy resin) as described in Example 19, 20 and 23.

A cube made in Example 20 containing microencapsulated aromatic tracer E was tested in synthetic oil following the procedure of Example 17. The elution profile is shown in FIG. 9. The release of tracer from the article was very slow but steady and sustained. Only less than 0.03% of the tracer was released within 26 days of elution. This is remarkably slower than the release of tracer E which was not microencapsulated as described in Comparative Example 14 and 15 below. The article comprising pure tracer E made in Comparative Examples 14 released about 28% of the initial amount of the tracer in 26 days (Comparative Example 15).

Example 24—Elution Test of Sustained Release Cube in a Synthetic Oil

Figure 10:
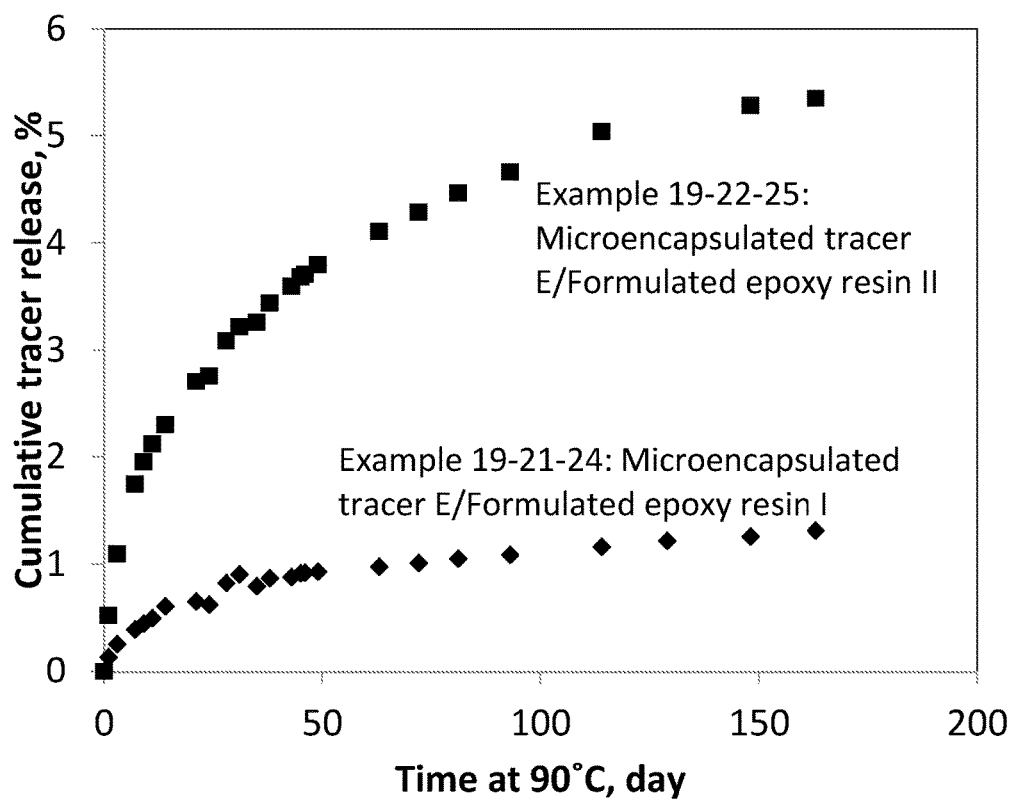
FIG. 10 is a graphical representation of the release rates of an aromatic tracer (tracer E) into synthetic oil at 90° C. from microcapsules in formulated bulk polymers (2 formulated epoxy resins: I and II) as described in Example 19, 21, 22, 24 and 25.

A cube made in Example 21 containing microencapsulated aromatic tracer E was tested in synthetic oil following the procedure of Example 17. The elution profile is shown in FIG. 10. Less than 1.5% of the tracer was released within 5 months of elution. The release of tracer from the article was steady, slow and sustained, but faster than using pure bisphenol A diglycidyl and triethylenetetramine as the bulk polymer (Example 20 and 23).

Example 25—Elution Test of Sustained Release Cube in a Synthetic Oil

A cube made in Example 22 containing microencapsulated Aromatic tracer E was tested in synthetic oil following the procedure of Example 17. The elution profile is also shown in FIG. 10. Less than 5.5% of the tracer was released within 5 months of elution. The release of tracer from the article was steady, slow and sustained, but much faster both than using pure bisphenol A diglycidyl ether and triethylenetetramine as the bulk polymer (Example 20 and 23) and using formulated epoxy resin I as bulk polymer.

Comparative Example 13—Elution Test of Aromatic Oil Tracer B that is not Microencapsulated from an Article into a Synthetic Oil An article made from Comparative Example 9 (mass: 3.7590 g) was tested in synthetic oil using the procedure described in Example 17.

Figure 11:
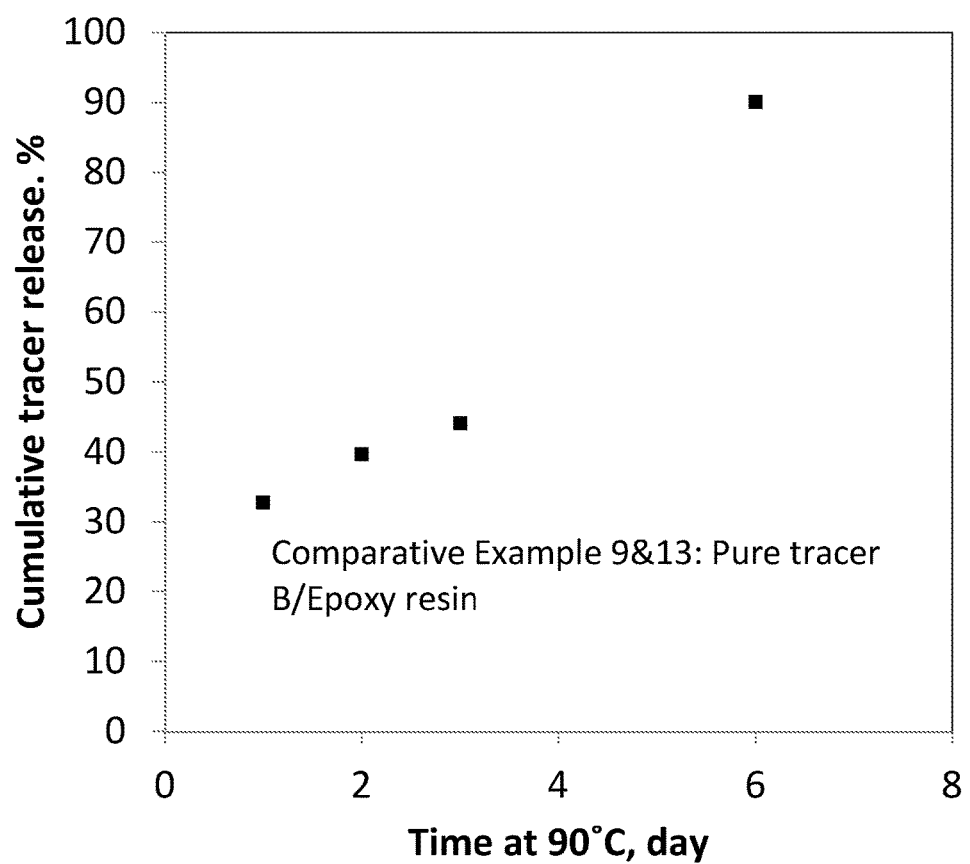
FIG. 11 is a graphical representation of the release rate of an aromatic tracer (tracer B) from pure tracer in a bulk polymer (epoxy resin) into synthetic oil at 90° C. as described in Comparative Example 9 and 13.

The elution profile of tracer B that was not microencapsulated from the cylinder of Comparative Example 9 is shown in FIG. 11. The release of the tracer from the article comprising the tracer B that was not microencapsulated was very fast and not sustained compared to the release of tracer that was microencapsulated as shown in Example 17 described above. The article made in Comparative Examples 9 released about 90% in 6 days. The compositions containing microencapsulated tracer released just less than 1% of the initial amount of tracer present within the same period of time (Example 17).

Comparative Example 14—Preparation of Release Articles with Oil Tracer E that is not Microencapsulated Oil tracer E was used without any grinding. A mixture of 10.0 g tracer E particles, 10.0 g bisphenol A diglycidyl ether (Sigma), and 1.0 g triethylenetetramine (technical grade, Sigma) were combined in a plastic container and mixed with a stainless steel spatula. The mixture was transferred to a 25 mL plastic syringe and injected into silicon moulds. The moulds were in a cube shape with edge length of 1.5 cm. The moulded composition was cured in an oven at 60° C. for 2 hours. The articles in the shape of a cube were easily removed from the moulds. The articles contained 47.6% by weight of tracer E. The cylinder showed an off-white colour.

Comparative Example 15—Elution Test of Aromatic Oil Tracer E that is not Microencapsulated from an Article into a Synthetic Oil An article made from Comparative Example 14 (mass: 5.1840 g) was tested in synthetic oil using the procedure described in Example 17.

Figure 12:
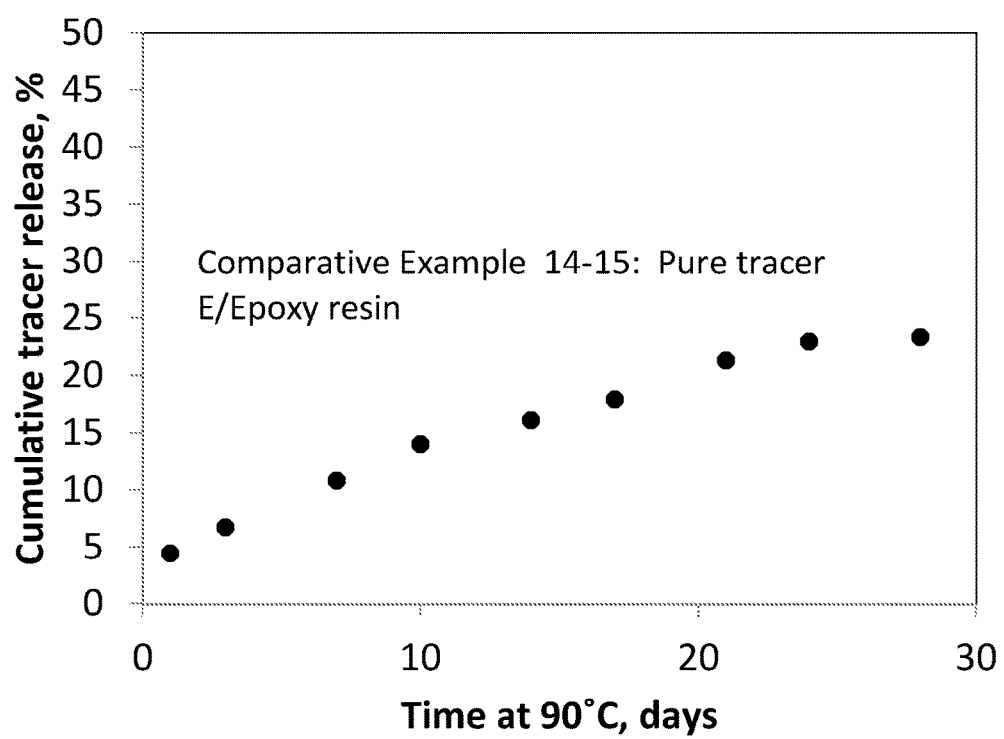
FIG. 12 is a graphical representation of the release rate of an aromatic tracer (tracer E) from pure tracer in a bulk polymer (epoxy resin) into synthetic oil at 90° C. as described in Comparative Example 14 and 15.

The elution profile of tracer E that was not microencapsulated from the cube of Comparative Example 14 is shown in FIG. 12. The release of the tracer from the article comprising the tracer E that was not microencapsulated was fast compared to the release of tracer that was microencapsulated as shown in Examples 21 and 23 described above. The article made in Comparative Examples 14 released about 28% in 26 days. The compositions containing microencapsulated tracer in Example 21 and 23 released just less than 0.03% of the initial amount of tracer present within 26 days.

Although the invention is illustrated and described herein with reference to specific aspects of the invention, the invention is not intended to be limited to the details shown. Rather, various modifications can be made in the details within the scope and range of equivalents of the claims and without departing from the invention.

What is claimed is:

1. A composition comprising: (a) microcapsules comprising an oil field chemical and a microencapsulant, where the microcapsules have an outer surface, and the oil field chemical is contained within the microcapsules, and (b) a bulk polymer, where the microcapsules are embedded within the bulk polymer.

2. The composition of claim 1, where the microcapsule comprises: a core shell structure comprising: (a) a core comprising at least one oil field chemical and (b) a shell comprising a polymeric microencapsulant.

3. The composition of claim 1, where the microcapsule comprises a core multi-shell structure comprising: (a) a core comprising at least one oil field chemical, (b) a first shell comprising a polymeric microencapsulant located adjacent to the core; and (c) one or more additional shells located over the first shell, each additional shell comprising a polymeric microencapsulant that is different than the polymeric microencapsulant in an adjacent shell.

4. The composition of claim 1, where the microcapsule comprises a multi-core shell structure comprising: (a) a core comprising a plurality of sub-cores, where each sub-core comprises at least one oil field chemical, and the sub-cores are dispersed in a non-polymeric compound, and (b) a shell comprising a polymeric microencapsulant.

5. The composition of claim 1, where the microcapsule comprises a micro-matrix structure comprising a core comprising at least one oil field chemical entrapped within a micro-matrix comprising a polymeric microencapsulant.

6. The composition of claim 1, where the microcapsule comprises a micro-matrix with shell structure comprising: (a) a core comprising at least one oil field chemical entrapped within a micro-matrix comprising a polymeric microencapsulant; and (b) a shell comprising a polymeric microencapsulant.

7. The composition of claim 1, where the microcapsule comprises a multi-core-micro-matrix with shell structure comprising: (a) a micro-matrix comprising a plurality of sub-cores, where each sub-core comprises at least one oil field chemical, and the sub-cores are entrapped within the micro-matrix, and (b) a shell comprising a polymeric microencapsulant.

8. The composition of claim 1, where, when the microcapsules comprise two or more shells, each shell comprises a polymeric microencapsulant that is different than the polymeric microencapsulant in an adjacent shell.

9. The composition of claim 1, where, when the microcapsule comprises two or more shells, one or more shells comprise an additive or an oil field chemical.

10. The composition of claim 1, wherein the microencapsulant is a melamine-formaldehyde, a urea-formaldehyde, a phenol-formaldehyde resin, a melamine-phenol-formaldehyde resin, a furan-formaldehyde resin, an epoxy resin, a polyacrylate, a polyester, a polyurethane, a polyamide, a polyether, a polyimide, a polyolefin, polypropylene-polyethylene copolymers, polystyrene, functionalized polystyrene derivatives, gelatin, a gelatin derivative, cellulose, a cellulose derivative, a starch, a starch derivative, a polyvinyl alcohol, an ethylene-vinylacetate copolymer, an ethylene-maleic-anhydride copolymer, a styrene-maleic anhydride copolymer, a vinyl acetate-maleic anhydride copolymer, a vinyl ether-maleic anhydride copolymer, a methyl vinyl ether-maleic anhydride copolymer, an octadecyl vinyl ether-maleic anhydride copolymer, a polyacrylamide, a polyacrylic acid, a polyvinylpyrrolidone, a polyvinylpyrrolidone based copolymer, a polyacrylate based copolymer, a polyacrylamide, or a polyacrylamide based copolymer, and mixtures thereof.

11. The composition of claim 1, where the microencapsulant comprises an inorganic material.

12. The composition of claim 1, where the bulk polymer is a thermosetting polymer, a thermoplastic polymer, or a blend thereof.

13. The composition of claim 1, wherein the bulk polymer comprises a polyethylene, a polypropylene, a polyacrylate, an aliphatic polyamide, a polyurethane, a vinyl ester, an epoxy resin, or a polybutylene terephthalate.

14. The composition of claim 1, wherein the microcapsules have a volume weighted average particle size of between 0.05 μm and 600 μm, inclusive.

15. The composition of claim 1, wherein the outer surface of the microcapsule comprises one or more groups that are reactive with the bulk polymer.

16. The composition of claim 1, wherein the composition is in the form of an article configured for placement in a hydrocarbon reservoir.

17. The composition of claim 1, where the composition releases <45% of the applied dose of tracer present in the microcapsule over a period of 45 days at 60° C. in a fluid representing an oil field fluid.

18. A hydrocarbon reservoir monitoring system comprising a composition of claim 1.

19. A method of making a composition of claim 1 comprising the steps of: (a) providing a plurality of microcapsules, each microcapsule comprising an oil field compound and a polymeric microencapsulant, where the microcapsule comprises a core shell structure, a core multishell structure, a multi-core shell structure, a micro-matrix structure, a micro-matrix with shell structure or a multi-core-micro-matrix with shell structure, and (b) embedding the microcapsule particles within a bulk polymer.

20. A method of tracing fluid flow from a hydrocarbon reservoir comprising the steps of placing within a well penetrating said reservoir a composition of claim 1, where the oil field chemical is a tracer, collecting one or more samples of fluids flowing from the well and analysing said sample to determine at least one of: (a) the presence or absence of the tracer and (b) the concentration of one or more tracers in fluids flowing from the well.

* * * * *